(12) United States Patent
Goodman et al.

(10) Patent No.: US 7,711,779 B2
(45) Date of Patent: May 4, 2010

(54) PREVENTION OF OUTGOING SPAM

(75) Inventors: Joshua T. Goodman, Redmond, WA (US); Robert L. Rounthwaite, Fall City, WA (US); Eliot C. Gillum, Los Gatos, CA (US)

(73) Assignee: Microsoft Corporation, Redmond, WA (US)

(*) Notice: Subject to any disclaimer, the term of this patent is extended or adjusted under 35 U.S.C. 154(b) by 872 days.

(21) Appl. No.: 10/601,159

(22) Filed: Jun. 20, 2003

(65) Prior Publication Data

US 2005/0021649 A1 Jan. 27, 2005

(51) Int. Cl.
G06F 11/30 (2006.01)
(52) U.S. Cl. ...................................................... 709/206
(58) Field of Classification Search ................. 709/206; 726/22
See application file for complete search history.

(56) References Cited

U.S. PATENT DOCUMENTS

| | | | |
|---|---|---|---|
| 5,377,354 | A | 12/1994 | Scannel et al. |
| 5,459,717 | A | 10/1995 | Mullan et al. |
| 5,619,648 | A | 4/1997 | Canale et al. |
| 5,638,487 | A | 6/1997 | Chigier |
| 5,704,017 | A | 12/1997 | Heckerman et al. |
| 5,805,801 | A | 9/1998 | Holloway et al. |
| 5,835,087 | A | 11/1998 | Herz et al. |
| 5,884,033 | A | 3/1999 | Duvall et al. |
| 5,905,859 | A | 5/1999 | Holloway et al. |
| 5,911,776 | A | 6/1999 | Guck |
| 5,930,471 | A | 7/1999 | Milewski et al. |
| 5,999,932 | A | 12/1999 | Paul |
| 6,003,027 | A | 12/1999 | Prager |
| 6,023,723 | A | 2/2000 | McCormick et al. |
| 6,041,321 | A | 3/2000 | Earl et al. |
| 6,041,324 | A | 3/2000 | Earl et al. |
| 6,047,242 | A | 4/2000 | Benson |

(Continued)

FOREIGN PATENT DOCUMENTS

CN 1350247 A 5/2002

(Continued)

OTHER PUBLICATIONS

European Search Report dated Apr. 6, 2006 and mailed Apr. 6, 2006 for EP 04102242, 3 pages.

(Continued)

*Primary Examiner*—Kenneth R Coulter
(74) *Attorney, Agent, or Firm*—Lee & Hayes, PLLC

(57) ABSTRACT

The subject invention provides for a system and method that facilitates detecting and preventing spam in a variety of networked communication environments. In particular, the invention provides several techniques for monitoring outgoing communications to identify potential spammers. Identification of potential spammers can be accomplished at least in part by a detection component that monitors per sender at least one of volume of outgoing messages, volume of recipients, and/or rate of outgoing messages. In addition, outgoing messages can be scored based at least in part on their content. The scores can be added per message per sender and if the total score(s) per message or per sender exceeds some threshold, then further action can be taken to verify whether the potential spammer is a spammer. Such actions include human-inspecting a sample of the messages, sending challenges to the account, sending a legal notice to warn potential spammers and/or shutting down the account.

61 Claims, 11 Drawing Sheets

U.S. PATENT DOCUMENTS

| | | |
|---|---|---|
| 6,052,709 A | 4/2000 | Paul |
| 6,072,942 A | 6/2000 | Stockwell et al. |
| 6,101,531 A | 8/2000 | Eggleston et al. |
| 6,112,227 A | 8/2000 | Heiner |
| 6,122,657 A | 9/2000 | Hoffman, Jr. et al. |
| 6,128,608 A | 10/2000 | Barnhill |
| 6,144,934 A | 11/2000 | Stockwell et al. |
| 6,157,921 A | 12/2000 | Barnhill |
| 6,161,130 A | 12/2000 | Horvitz et al. |
| 6,167,434 A | 12/2000 | Pang |
| 6,192,114 B1 | 2/2001 | Council |
| 6,192,360 B1 | 2/2001 | Dumais et al. |
| 6,199,102 B1 | 3/2001 | Cobb |
| 6,199,103 B1 | 3/2001 | Sakaguchi et al. |
| 6,249,807 B1 | 6/2001 | Shaw et al. |
| 6,266,692 B1 | 7/2001 | Greenstein |
| 6,308,273 B1 | 10/2001 | Goertzel et al. |
| 6,314,421 B1 | 11/2001 | Sharnoff et al. |
| 6,321,267 B1 | 11/2001 | Donaldson |
| 6,324,569 B1 | 11/2001 | Ogilvie et al. |
| 6,327,617 B1 | 12/2001 | Fawcett |
| 6,330,590 B1 | 12/2001 | Cotten |
| 6,332,164 B1 | 12/2001 | Jain |
| 6,351,740 B1 | 2/2002 | Rabinowitz |
| 6,370,526 B1 | 4/2002 | Agrawal et al. |
| 6,393,465 B2 | 5/2002 | Leeds |
| 6,421,709 B1 | 7/2002 | McCormick et al. |
| 6,424,997 B1 | 7/2002 | Buskirk, Jr. et al. |
| 6,427,141 B1 | 7/2002 | Barnhill |
| 6,434,600 B2 | 8/2002 | Waite et al. |
| 6,453,327 B1 | 9/2002 | Nielsen |
| 6,477,551 B1 | 11/2002 | Johnson et al. |
| 6,484,197 B1 | 11/2002 | Donohue |
| 6,484,261 B1 | 11/2002 | Wiegel |
| 6,505,250 B2 | 1/2003 | Freund et al. |
| 6,519,580 B1 | 2/2003 | Johnson et al. |
| 6,546,390 B1 | 4/2003 | Pollack et al. |
| 6,546,416 B1 * | 4/2003 | Kirsch ................. 709/206 |
| 6,592,627 B1 | 7/2003 | Agrawal et al. |
| 6,615,242 B1 | 9/2003 | Riemers |
| 6,618,747 B1 | 9/2003 | Flynn et al. |
| 6,633,855 B1 | 10/2003 | Auvenshine |
| 6,643,686 B1 | 11/2003 | Hall |
| 6,654,787 B1 | 11/2003 | Aronson et al. |
| 6,684,201 B1 | 1/2004 | Brill |
| 6,691,156 B1 | 2/2004 | Drummond et al. |
| 6,701,350 B1 | 3/2004 | Mitchell |
| 6,701,440 B1 | 3/2004 | Kim et al. |
| 6,704,772 B1 | 3/2004 | Ahmed et al. |
| 6,728,690 B1 | 4/2004 | Meek et al. |
| 6,732,149 B1 | 5/2004 | Kephart |
| 6,732,157 B1 | 5/2004 | Gordon et al. |
| 6,732,273 B1 | 5/2004 | Byers |
| 6,742,047 B1 | 5/2004 | Tso |
| 6,748,422 B2 | 6/2004 | Morin et al. |
| 6,751,348 B2 | 6/2004 | Buzuloiu et al. |
| 6,757,830 B1 | 6/2004 | Tarbotton et al. |
| 6,768,991 B2 | 7/2004 | Hearnden |
| 6,775,704 B1 | 8/2004 | Watson et al. |
| 6,779,021 B1 * | 8/2004 | Bates et al. ................. 709/206 |
| 6,785,820 B1 | 8/2004 | Muttik |
| 6,842,773 B1 | 1/2005 | Ralston et al. |
| 6,853,749 B2 | 2/2005 | Watanabe et al. |
| 6,901,398 B1 | 5/2005 | Horvitz et al. |
| 6,915,334 B1 | 7/2005 | Hall |
| 6,920,477 B2 | 7/2005 | Mitzenmacher |
| 6,928,465 B2 | 8/2005 | Earnest |
| 6,957,259 B1 * | 10/2005 | Malik ................. 709/225 |
| 6,971,023 B1 | 11/2005 | Makinson et al. |
| 6,990,485 B2 | 1/2006 | Forman et al. |
| 7,003,555 B1 | 2/2006 | Jungck |
| 7,032,030 B1 | 4/2006 | Codignotto |
| 7,051,077 B2 | 5/2006 | Lin |
| 7,072,942 B1 | 7/2006 | Maller |
| 7,117,358 B2 | 10/2006 | Bandini et al. |
| 7,146,402 B2 | 12/2006 | Kucherawy |
| 7,155,243 B2 | 12/2006 | Baldwin et al. |
| 7,155,484 B2 | 12/2006 | Malik |
| 7,188,369 B2 | 3/2007 | Ho et al. |
| 7,206,814 B2 | 4/2007 | Kirsch |
| 7,219,148 B2 | 5/2007 | Rounthwaite et al. |
| 7,249,162 B2 | 7/2007 | Rounthwaite et al. |
| 7,263,607 B2 | 8/2007 | Ingerman et al. |
| 7,287,060 B1 * | 10/2007 | McCown et al. ............ 709/206 |
| 7,293,063 B1 | 11/2007 | Sobel |
| 7,320,020 B2 | 1/2008 | Chadwick et al. |
| 7,321,922 B2 | 1/2008 | Zheng et al. |
| 7,359,941 B2 | 4/2008 | Doan et al. |
| 7,366,761 B2 | 4/2008 | Murray et al. |
| 2001/0046307 A1 | 11/2001 | Wong |
| 2001/0049745 A1 * | 12/2001 | Schoeffler ................. 709/238 |
| 2002/0016956 A1 | 2/2002 | Fawcett |
| 2002/0059425 A1 | 5/2002 | Belfiore et al. |
| 2002/0073157 A1 | 6/2002 | Newman et al. |
| 2002/0091738 A1 | 7/2002 | Rohrabaugh et al. |
| 2002/0124025 A1 | 9/2002 | Janakiraman et al. |
| 2002/0129111 A1 | 9/2002 | Cooper |
| 2002/0147782 A1 | 10/2002 | Dimitrova et al. |
| 2002/0174185 A1 | 11/2002 | Rawat et al. |
| 2002/0184315 A1 | 12/2002 | Earnest |
| 2002/0199095 A1 | 12/2002 | Bandini et al. |
| 2003/0009495 A1 | 1/2003 | Adjaoute |
| 2003/0009698 A1 | 1/2003 | Lindeman et al. |
| 2003/0016872 A1 | 1/2003 | Sun |
| 2003/0037074 A1 | 2/2003 | Dwork et al. |
| 2003/0041126 A1 | 2/2003 | Buford et al. |
| 2003/0088627 A1 | 5/2003 | Rothwell et al. |
| 2003/0149733 A1 | 8/2003 | Capiel |
| 2003/0167311 A1 * | 9/2003 | Kirsch ................. 709/206 |
| 2003/0191969 A1 | 10/2003 | Katsikas |
| 2003/0204569 A1 * | 10/2003 | Andrews et al. ............ 709/206 |
| 2003/0320054 | 10/2003 | Cheng et al. |
| 2003/0229672 A1 | 12/2003 | Kohn |
| 2004/0003283 A1 * | 1/2004 | Goodman et al. ............ 713/201 |
| 2004/0015554 A1 * | 1/2004 | Wilson ................. 709/206 |
| 2004/0019650 A1 | 1/2004 | Auvenshine |
| 2004/0019651 A1 | 1/2004 | Andaker |
| 2004/0054887 A1 | 3/2004 | Paulsen et al. |
| 2004/0059697 A1 | 3/2004 | Forman |
| 2004/0073617 A1 | 4/2004 | Milliken et al. |
| 2004/0083270 A1 | 4/2004 | Heckerman et al. |
| 2004/0093371 A1 | 5/2004 | Burrows et al. |
| 2004/0139160 A1 | 7/2004 | Wallace et al. |
| 2004/0139165 A1 | 7/2004 | McMillan et al. |
| 2004/0148330 A1 | 7/2004 | Alspector et al. |
| 2004/0177120 A1 * | 9/2004 | Kirsch ................. 709/206 |
| 2004/0199585 A1 | 10/2004 | Wang |
| 2004/0199594 A1 | 10/2004 | Radatti et al. |
| 2004/0210640 A1 | 10/2004 | Chadwick et al. |
| 2004/0215977 A1 | 10/2004 | Goodman et al. |
| 2004/0255122 A1 | 12/2004 | Ingerman et al. |
| 2004/0260776 A1 | 12/2004 | Starbuck et al. |
| 2005/0015455 A1 | 1/2005 | Liu |
| 2005/0021649 A1 | 1/2005 | Goodman et al. |
| 2005/0050150 A1 | 3/2005 | Dinkin |
| 2005/0060643 A1 | 3/2005 | Glass et al. |
| 2005/0076084 A1 | 4/2005 | Loughmiller et al. |
| 2005/0080855 A1 | 4/2005 | Murray |
| 2005/0080889 A1 | 4/2005 | Malik et al. |
| 2005/0081059 A1 | 4/2005 | Bandini et al. |
| 2005/0091321 A1 | 4/2005 | Daniell et al. |
| 2005/0097174 A1 | 5/2005 | Daniell |
| 2005/0102366 A1 | 5/2005 | Kirsch |
| 2005/0108340 A1 | 5/2005 | Gleeson et al. |

| | | | |
|---|---|---|---|
| 2005/0114452 | A1 | 5/2005 | Prakash |
| 2005/0120019 | A1 | 6/2005 | Rigoutsos et al. |
| 2005/0159136 | A1 | 7/2005 | Rouse et al. |
| 2005/0160148 | A1 | 7/2005 | Yu |
| 2005/0165895 | A1 | 7/2005 | Rajan et al. |
| 2005/0182735 | A1 | 8/2005 | Zager et al. |
| 2005/0188023 | A1 | 8/2005 | Doan et al. |
| 2005/0204005 | A1 | 9/2005 | Purcell et al. |
| 2005/0204006 | A1 | 9/2005 | Purcell et al. |
| 2005/0204159 | A1 | 9/2005 | Davis et al. |
| 2005/0228899 | A1 | 10/2005 | Wendkos et al. |
| 2006/0015942 | A1 | 1/2006 | Judge et al. |
| 2006/0031303 | A1 | 2/2006 | Pang |
| 2006/0031306 | A1 | 2/2006 | Haverkos |
| 2006/0036693 | A1 | 2/2006 | Hulten et al. |
| 2006/0036701 | A1 | 2/2006 | Bulfer et al. |
| 2006/0123083 | A1 | 6/2006 | Goutte et al. |
| 2006/0265498 | A1 | 11/2006 | Turgeman et al. |
| 2007/0101423 | A1 | 5/2007 | Oliver et al. |
| 2007/0118759 | A1 | 5/2007 | Sheppard |
| 2007/0130350 | A1 | 6/2007 | Alperovitch et al. |
| 2007/0130351 | A1 | 6/2007 | Alperovitch et al. |
| 2007/0133034 | A1 | 6/2007 | Jindal et al. |
| 2007/0208856 | A1 | 9/2007 | Rounthwaite et al. |
| 2008/0016579 | A1* | 1/2008 | Pang ............................ 726/26 |
| 2008/0104186 | A1 | 5/2008 | Wieneke et al. |

FOREIGN PATENT DOCUMENTS

| | | |
|---|---|---|
| EP | 413 537 | 2/1991 |
| EP | 0413537 A2 | 2/1991 |
| EP | 720 333 | 7/1996 |
| EP | 1376427 | 3/2003 |
| EP | 1300997 A2 | 4/2003 |
| EP | 1376427 A2 | 1/2004 |
| EP | 1376427 A2 | 1/2004 |
| EP | 1376427 A3 | 1/2004 |
| EP | 1376427 A3 | 1/2004 |
| JP | 10074172 A | 3/1998 |
| JP | 2000163341 A | 6/2000 |
| JP | 2002149611 A | 5/2002 |
| JP | 2002164887 A | 6/2002 |
| TW | 519591 | 2/2003 |
| TW | 520483 | 2/2003 |
| TW | 521213 | 2/2003 |
| WO | WO96/35994 | 11/1996 |
| WO | WO9635994 A1 | 11/1996 |
| WO | WO9910817 A1 | 3/1999 |
| WO | WO9937066 A1 | 7/1999 |
| WO | 9967731 | 12/1999 |
| WO | WO0146872 A1 | 6/2001 |
| WO | WO0219069 A2 | 3/2002 |
| WO | WO0223390 A2 | 3/2002 |
| WO | WO0230054 A1 | 4/2002 |
| WO | WO 02/071286 | 9/2002 |
| WO | WO02071286 A2 | 9/2002 |
| WO | WO02082226 A2 | 10/2002 |
| WO | 03054764 | 7/2003 |
| WO | WO 2004/059506 | 7/2004 |
| WO | WO2004059506 A1 | 7/2004 |

OTHER PUBLICATIONS

Graham. "The Future of SPAM" (2003) Computer Journal, CSI Computer Security Institute, vol. 19, No. 1, 6 pages.
International Search Report dated Jan. 17, 2006, mailed Jan. 31, 2006, for PCT Application Serial No. PCT/US04/05501, 2 Pages.
Written Opinion of the International Preliminary Examining Authority mailed Nov. 30, 2005 for PCT/US03/41526, 5 pages.
U.S. Appl. No. 10/208,150, filed Jul. 29, 2002, Andaker.
U.S. Appl. No. 09/893,941, filed Jun. 28, 2001, Horvitz.
U.S. Appl. No. 10/278,591, filed Oct. 23, 2002, Heckerman.
U.S. Appl. No. 10/180,565, filed Jun. 26, 2002, Goodman.
U.S. Appl. No. 09/497,992, filed Feb. 4, 2000, Maller.
U.S. Appl. No. 10/291,260, filed Nov. 8, 2002, Burrows.
Breiman, Friedman, Olshen, and Stone. "Classification and Regression Trees." Wadsworth & Brooks, Monterey, CA (1984).
Quinlan. "C4.5: Programs for Machine Learning." Morgan Kaufmann, San Francisco, CA (1993).
Hayes, Brian. "Spam, Spam, Spam, Lovely Spam." American Scientist Online, Jun. 30, 2003. pp. 1-6. vol. 91.
European Search Report, dated Jun. 9, 2005, mailed Aug. 22, 2005 for European Patent Application Serial No. EP04011978, 12 pages.
Hayes, Brian."Spam, Spam, Spam, Lovely Spam." American Scientist Online, Jun. 30, 2003. pp. 1-6. vol. 91.
Bowman, Lisa M. "Hotmail Spam Filters Block Outgoing E-mail." CNET News.com Jan. 18, 2001. 3 pgs.
Byrne, Julian. "My Spamblock Was Thwarting UCE Address Culling Programs." (Newsgroups: news.admin.net-abuse.email, comp.mail.sendmail, comp.security.unix) Jan. 19, 1997.
Skoll, David F. "How To Make Sure A Human Is Sending You Mail." (Newsgroups: news.admin.net-abuse.usenet) Nov. 17, 1996.
European Search Report dated Jun. 9, 2005, mailed Aug. 22, 2005 for European Patent Application Serial No. EP04011978, 12 Pages.
Partial European Search Report, EP33823TE900kap, mailed Jun. 21, 2005.
Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.
Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.
Graham, P., The Future of Spam, Computer Security Journal, CSI Computer Security Institute, vol. 19, No. 1, Jan. 2003, pp. 1-5.
Graham, P., A Plan for Spam, Online!, Aug. 2002, XP002273602, http://www.paulgraham.com/spam.html, retrieved on Mar. 12, 2004.
European Search Report, EP31087TE900, mailed Nov. 11, 2004.
J. Byrne, My Spamblock, Google, Jan. 19, 1997, 2 pages.
D. F. Skoll, How to Make Sure a Human is Sending You Mail, Google, Nov. 17, 1996, 2 pages.
L. M. Bowman, Hotmail Spam Filters Block Outgoing E-Mail, CNET News.Com, Jan. 18, 2001, 3 pages.
D. Turner et al., Payment-based Email. 5th International Conference on Software Engineering, Artificial Intelligence, Networking, and Parallel/Distributed Computing, Jun. 2004. 7 pages.
D.A. Turner et al., Controlling Spam through Lightweight Currency. In Proc. of the Hawaii International Conference on Computer Sciences, Jan. 2004. 9 pages.
Fabrizio Sebastiani. Machine Learning in Automated Text Categorization. ACM Computing Surveys, vol. 34 Issue 1, pp. 1-47, 2002.
I. Androutsopoulos, et al. Learning to Filter Spam E-mail: A Comparison of a Naive Bayesian and a Memory-based Approach. 4th PKDD's Workshop on Machine Learning and Textual Information Access, 2000. 13 pages.
I. Androutsopoulos,et al., An Experimental Comparison of Naive Bayesian and Keyword—based Anti-spam Filtering with Personal E-mail Messages. Proceedings of the 23rd ACM SIGIR Conference, pp. 160-167, 2000.
P. Pantel, et al., SpamCop: A Spam Classification & Organization Program. In Proc. AAAI-1998 Workshop on Learning for Text Categorization, 1998. 8 pages.
G. Manco, et al., Towards an Adaptive Mail Classifier. In Proc. of Italian Association for Artificial Intelligence Workshop, 2002. 12 pages.
Cormac O'Brien, et al., Spam Filters: Bayes vs. Chi-squared; Letters vs. Words, Proceedings of the 1st international symposium on Information and communication technologies, 2003, pp. 291-296, Dublin, Ireland.
Olle Balter, et al., Bifrost lnbox Organizer: Giving users control over the inbox, NordiCHI Oct. 2, 2002, pp. 111-118. Arhus, Denmark.
Lorrie Faith Cranor, et al., Spam!, Communications of the ACM, 1998, pp. 74-83, vol. 41-No. 8.
John Wong, Preventing Spams and Relays, Linux Journal, Dec. 1998, 6 pages, vol. 1998 Issue 56es, Specialized Systems Consultants, Inc.

Meng Weng Wong, SPF Overview, Linux Journal, Apr. 2004, 6 pages, vol. 2004 Issue 120, Specialized Systems Consultants, Inc.
Stop, in the Name of Spam, Communications of the ACM, Nov. 1998, pp. 11-14, vol. 41 No. 11, ACM.
Eric Allman, Spam, Spam, Spam, Spam, Spam, the FTC, and Spam, Queue, Sep. 2003, pp. 62-69, vol. 1 Issue 6, ACM.
Tom Fawcett, "In vivo" Spam Filtering: A Challenge Problem for KDD, SIGKDD Explorations, Dec. 2003, pp. 140-148, vol. 5 Issue 2, ACM.
J.D.M. Rennie, ifile: An Application of Machine Learning to E-Mail Filtering. Proceedings of the KDD-2000 Workshop on Text Mining, Sixth ACM SIGKDD International Conference on Knowledge Discovery and Data Mining, 2000. 6 pages.
S. Argamon, et al., Routing documents according to style. In First International Workshop on Innovative Information Systems, 1998. 8 pages.
K. Mock, An Experimental Framework for Email Categorization and Management. Proceedings of the 24th Annual International ACM SIGIR Conference, pp. 392-393, 2001.
Jose Maria Gomez Hidalgo, Evaluating Cost-Sensitive Unsolicited Bulk Email Categorization, SAC 2002, 2002, pp. 615-620, ACM, Madrid, Spain.
A.Z. Broder, et al. Syntactic Clustering of the Web. SRC Technical Note, Digital Corporation, Jul. 25, 1997. 13 pages.
P.Y. Simard, et al., Using Character Recognition and Segmentation to Tell Computer from Humans. International Conference on Document Analysis and Recogntion (ICDAR), IEEE Computer Society, Los Alamitos, pp. 418-423, 2003.
S. Li et al., Secure Human-Computer Identification against Peeping: A Survey. Technical Report, Microsoft Research, 2003. 53 pages.
Cynthia Dwork, et al.; "Pricing Via Processing or Combatting Junk Mail"; Presented at Crypto '92; pp. 1-11.
Thorsten Joachims; "Text Categorization with Support Vector Machines: Learning with Many Relevant Features"; LS-8 Report 23, Nov. 1997, 18 pages.
Daphne Koller, et al.; "Hierarchically Classifying Doucments Using Very Few Words"; In ICML-97: Proceedings of the Fourteenth International Conference on Machine Learning; San Francisco, CA: Morgan Kaufmann 1997; 9 pages.
Ellen Spertus; "Smokey: Automatic Recognition of Hostile Messages"; Proceedings of the Conference on Innovative Applications in Artificial Intelligence (IAAI), 1997, 8 pages.
Hinrich Schutze, et al.; "A Comparison of Classifiers and Document Representations for the Routing Problem"; Proceedings of the 18th Annual International ACM SIGIR Conference on Research and Development in Information Retrieval, Seattle, WA, Jul. 9-13, 1995; pp. 229-237.
Yiming Yang, et al.; "A Comparative Study on Feature Selection in Text Categorization"; School of Computer Science, Carnegie Mellon University, Pittsburgh, PA, and Verity, Inc., Sunnyvale, CA; 9 pages.
Yiming Yang, et al.; "An Example-Based Mapping Method for Text Categorization and Retrieval"; ACM Transactions on Information Systems, vol. 12, No. 3, Jul. 1994, pp. 252-277.
David D. Lewis, et al.; "A Comparison of Two Learning Algorithms for Text Categorization"; Third Annual Symposium on Document Analysis and Information Retrieval; Apr. 11-13, 1994; pp. 81-93.
Mehran Sahami; "Learning Limited Dependence Bayesian Classifiers"; In KDD-96: Proceedings of the Second International Conference on Knowledge Discovery and Data Mining; AAAI Press, 1996; Menlo Park, CA; pp. 335-338.
William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.
Makoto Iwayama, et al.; "Hierarchical Bayesian Clustering for Automatic Text Classifiation"; Natural Language; 1995; pp. 1322-1327.
David D. Lewis; "An Evaluation of Phrasal and Clustered Representations on a Text Categorization Task"; 15th Annual International SIGIR '92; Denmark 1992; pp. 37-50.
Daphne Koller, et al.; "Toward Optimal Feature Selection"; Machine Learning; Proc. of the Thirteenth International Conference, Morgan Kaufmann, 1996, 9 pages.

David Dolan Lewis; "Representation and Learning in Information Retrieval"; University of Massachusetts, 1992.
Tom Mitchell; "Machine Learning"; Carnegie Mellon University, Bayesian Learning, Chapter 6, pp. 180-184.
Y. H. Li, et al.; "Classification of Text Documents"; Department of Computer Science and Engineering, Michigan State University, E. Lansing, Michigan, The Computer Journal, vol. 41, No. 8, 1998; 537-546.
Juha Takkinen, et al.; "CAFE: A Conceptual Model for Managing Information in Electronic Mail"; Laboratory for Intelligent Information Systems, Department of Computer and Information Science, Linkoping University, Sweden, Conference on System Sciences, 1998 IEEE.
Jacob Palme, et al.; "Issues When Designing Filters In Messaging Systems"; Department of Computer and Systems Sciences, Stockholm University, Royal Institute of Technology, Skeppargarten 73, S-115 30, Stockholm, Sweden, Computer Communications; 1996; pp. 95-101.
Richard B. Segal, et al., "SwiftFile: An Intelligent Assistant for Organizing E-Mail"; IBM Thomas J. Watson Research Center.
Mehran Sahami, et al., "A Beyesian Approach to Filtering Junk E-Mail"; Stanford University.
David Madigan, "Statistics and the War on Spam," Rutgers University, pp. 1-13, 2003 .
Padraig Cunningham, et al., "A Case-Based Approach to Spam Filtering that Can Track Concept Drift," Trinity College, Dublin,Department of Computer Science, May 13, 2003.
Mark Rosen, "E-mail Classification in the Haystack Framework," Massachusetts Institute of Technology, Feb. 2003.
Kevin R. Gee, Using Latent Semantic Indexing to Filter Spam, Dept. of Computer Science and Engineering, University of Texas-Arlington, 5 pages.
Thorsten Joachims, Transductive Inference for Text Classification Using Support Vector Machines, In Proceedings of the 16th International Conference on Machine Learning, 1999, pp. 200-209, San Francisco, USA.
Federal Trade Commission. "False Claims in Spam", A report by the FTC's division of marketing practices, Apr. 30, 2003, http://www.ftc.gov/reports/spam/030429spamreport.pdf.
Hansell. "Internet is losing ground in battle against spam", The New York Times: Technology section, Apr. 22, 2003, 2003.
European Search report dated Feb. 23, 2007, mailed Feb. 28, 2007 for European Patent Application Serial No. 05105308, 4 pages.
European Search Report dated Jul. 5, 2006, mailed Jul. 24, 2006 for European Application No. EP 06 01 2631, 3 pages.
"MIME", The Microsoft Computer Dictionary. 5th ed. Redmond, WA; Microsoft Press. May 1, 2002.
Ron White, How Computers Work, 2004, QUE Publishing, pp. 238-239.
Michael S. Mimoso, "Quick Takes: Image Analysis, Filtering Comes to E-mail Security", http://searchsecurity.techtarget.com/originalContent.html (Feb. 5, 2002).
"Clearswift Announces the Most Complete e-Policy-Based Email Content Security Product for Service Providers", http://www.clearswift.com/news/item.aspx?ID=144. (Oct. 12, 2002).
OA dated Oct. 8, 2008 for U.S. Appl. No. 11/743,466, 43 pages.
OA dated Nov. 28, 2008 for U.S. Appl. No. 10/799,455, 53 pages.
OA dated Nov. 6, 2008 for U.S. Appl. No. 10/799,992, 46 pages.
OA dated Jan. 16, 2009 for U.S. Appl. No. 10/917,077, 34 pages.
Kawamata, et al., "Internet Use Limitation", Started by Company, Part II. Full Monitoring/Limiting Software, NIKKEI Computer, No. 469, Nikkei Business Publications, Inc, May 10, 1999, pp. 87-91.
European Search Report dated Apr. 6, 2006 and mailed Apr. 6, 2006 for EP 04102242, 3 pages.
European Search Report, dated Jun. 9, 2005, mailed Aug. 22, 2005 for European Patent Application Serial No. EP04011978, 12 pages.
International Search Report dated Jan. 17, 2006, mailed Jan. 31, 2006, for PCT Application Serial No. PCT/US04/05501, 2 pages.
International Search Report, EP 03 00 6814, mailed Feb. 13, 2004.
Partial European Search Report, EP05100847, mailed Jun. 21, 2005, 5 pages.

Shimmin, B.F., "Effective use of electronic post", FENIX Publishing House, Rostov-na-Donu, 1998, pp. 229-249.

Stop, in the Name of Spam, Communications of the ACM, Nov. 1998, pp. 11-14, vol. 41 No. 11, ACM.

Written Opinion of the International Preliminary Examining Authority mailed Nov. 30, 2005 for PCT/US03/41526, 5 pages.

Notice on First Office Action for Chinese Patent Application No. 200410063149.0 dispatched on Nov. 6, 2009, 8 pgs.

Notice of Rejection for Japanese Patent Application No. 2006-508818 mailed Dec. 22, 2009, 9 pgs.

* cited by examiner

PREVENTION OF OUTGOING SPAM

TECHNICAL FIELD

This invention is related to systems and methods for identifying spam messages, and more particularly that monitor outgoing communications to facilitate identifying spam senders.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group. Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, spam is now or soon will become a major threat to trustworthy computing.

Common techniques utilized to thwart spam involve the employment of filtering systems/methodologies. One proven filtering technique is based upon a machine learning approach. Machine learning filters assign to an incoming message a probability that the message is spam. In this approach, features typically are extracted from two classes of example messages (e.g., spam and non-spam messages), and a learning filter is applied to discriminate probabilistically between the two classes. Since many message features are related to content (e.g., words and phrases in the subject and/or body of the message), such types of filters are commonly referred to as "content-based filters".

Moreover, conventional spam filters and filtering techniques typically operate on or with respect to incoming messages. That is, incoming messages are passed through a filter to distinguish spam messages from good messages. These types of filters are problematic because many spammers have thought of ways to avoid and/or bypass such filters. Thus, conventional content-based and/or adaptive spam filters are typically ineffective in effectively identifying spam and blocking incoming messages.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention provides for a system and method that facilitates detecting and preventing spam in a variety of networked communication environments. In particular, the invention provides several techniques for monitoring outgoing communications such as email, instant messaging, whisper-chat room, and/or chat room messages to identify potential spam senders, also referred to as spammers. Spammers often attempt to take advantage of legitimate Internet Service Providers (ISPs) or other messaging services by using such services to send their spam. This, however, can seriously increase the bandwidth of the ISPs as well as increase their support costs and decrease their reputation as a trusted source of messages which can impede their ability to get legitimate messages delivered. The problem is particularly important for ISPs who offer free user accounts because they are the easiest for spammers to take advantage of.

Unlike conventional spam prevention methodologies, the present invention identifies potential spammers by examining users' outgoing messages—as opposed to incoming messages. One technique involves tracking sender message volumes and/or recipient counts. For example, the ISP server(s) called to send a message can keep a count of the number of messages sent by a particular user. Alternatively, the ISP server(s) can examine the "To" and "cc" (carbon copy) lines of a message to count the number of recipients for that particular message. These types of counts can be tracked over a period of time (e.g., per hour, per day, per week, per month, per year, every h hours, every d days, etc . . . ) or a total count of messages the user ever sent (e.g., since the account was activated or opened to the present) can be obtained. This technique is particularly useful because most spammers send messages to a relatively large number of recipients while legitimate users usually send messages to a relatively small number of recipients.

A second technique for recognizing potential spammers involves machine learning systems and methods. For instance, spam messages have features that are characteristic to them and not typically found in legitimate messages. Such features can be identified and used in connection with a machine learning system to build and train filters. The machine learning system can assign a probability to outgoing messages to convey to an ISP serve or server operator that the respective outgoing messages fall somewhere in the range of being most likely not spam to most likely spam. The server handling the outgoing messages can then determine proper courses of action based at least in part upon the probability that one or more of the outgoing messages are most likely spam. Senders who send many messages that have high probabilities of being spam can be treated as more suspicious than senders who send only messages with low probability of being spam.

In addition to or instead of assigning a probability to some or all outgoing messages using a filter, the outgoing messages can be scored based on certain important characteristics, wherein a higher score can mean that the particular message is more likely to be spam. For example, essentially all spam contains a way to contact the spammer. Such as a URL or phone number. Messages with URLs, links, or phone numbers can be given a high score, and those without them can be given a lower score, or even 0 score. These scores can be added to the machine learning system probabilities for the respective messages, or used instead of the filter.

Some spammers can manipulate machine learning systems and the like to assign outbound messages scores of 0 or near 0 to make it appear as if spam messages pass through as not spam or less spam-like despite the message contents. Thus, another aspect of the present invention facilitates mitigating spammer manipulation by always or almost always assigning some minimum score to each outbound message so that the sum of scores (e.g., total score per message=MLS probability+minimum score) increases at some reasonable rate. Alternatively, a minimum score could set for each message, e.g., total score per message=max (MLS probability, minimum score). If the sum total per outgoing message exceeds some threshold amount, then that message and/or the respective sender can be flagged as a potential spammer.

Yet another technique to detect potential spammers involves tracking and counting the number of distinct recipients a user sends messages to. Spammers tend to send out fewer messages to many different recipients. However, in the present invention, one message sent to 20 recipients (e.g., 20 recipients listed in the "To:" field) constitutes 20 messages. Thus, the task of counting the number of distinct recipients a user has sent to can be extremely costly and inefficient. To mitigate such high inefficiencies, a sampling or polling of all message recipients can be performed in order to estimate a total number of recipients per sender over any desired period of time.

Spammers are much more likely than legitimate users to try to send mail to invalid mailboxes. Therefore, a large number of failed delivery attempts is also indicative of spam. These failures can occur at message delivery time, or also as NDRs (non-delivery receipts) sent back to the sender. One disadvantage of this technique is that sometimes, users will be victims of spammers sending spam in their name, leading to NDRs that are not actually from the user. It may be useful to verify that the message is actually from the sender. This can be done, for instance, by keeping track of recipients of messages from the user, or by keeping track of messages sent by the user. A large score can be assigned for each delivery failure.

In addition, particular recipients can be tracked to maintain a record of the types of messages received from particular senders such as those suspected of being potential spammers. Messages addressed to these particular recipients can be scored and/or assigned a MLS probability. The worst-scoring message per recipient can be tracked as well per sender. Thus, a total of all recipients' worst scores can be computed per sender to facilitate determining whether the senders are potential spammers. This allows legitimate senders to send large numbers of non-spam like messages to recipients, with no or minor penalties. Sending a single spam like message however is bad. Part of the assumption here is that a given recipient is likely to block or report any spammer who sends multiple messages to the same recipient, or at least to recognize the sender name and not open additional messages.

Spammers are unlikely to send legitimate mail. Therefore an assumption could be made that users who send large amounts of legitimate mail and small amounts of spam-like mail are likely to be legitimate. Hence, the amount of apparently legitimate mail sent by users can be tracked, and a "bonus" can be provided to the user(s) for sending legitimate mail. The bonus can be in the form of an addition or subtraction to the sender's score. Alternatively, the bonus may be in the form of permitting the user(s) to send additional outgoing messages (e.g., beyond the quantity allotted per given time frame). Spammers may attempt to exploit this technique by sending legitimate mail. Thus, the potential bonus can be limited, for example, by number of bonuses per user in a given time frame.

After identifying the potential spammers, several actions can be taken against them to either discourage or prohibit subsequent spam activity. According to one approach, the user account may be shut down if it is relatively certain that the user is a spammer. Other less drastic approaches are also available for implementation as desired by an ISP or message program operator/server. In addition to a temporary stoppage of message delivery from the potential spammers, the other approaches include manually inspecting a portion of a sender's outgoing messages, sending warnings regarding user account and spam policies via pop-up or regular messages, and/or sending challenges to the potential spammer such as computational or human interactive proof (HIP) challenges. Message delivery may or may not resume depending on the responses received from the potential spammers.

Economic analyses of spammer behavior can be performed under certain assumptions. For instance, one HIP for each 100 messages sent could be required. If it costs spammers 5 cents to pay someone to solve a HIP (or 5 cents worth of their own time), then this imposes a cost of 0.05 cents per message. If it is assumed that recipients who receive spam from the same person are likely to block or ignore messages after the first one, then alternatively, one HIP for each 100 unique recipients could be required, but allow an unlimited number of messages to those recipients. Since many users do not send to more than 100 unique recipients, most users would only be required to solve one HIP at account creation time, but spammers would incur a high cost (perhaps to the point of unprofitability.)

Economic analyses can also be performed as follows. Imagine that there is some probability that when spam is received, the receiver will complain to the sender's ISP, resulting in account termination. For instance, assume that when a spammer sends 2000 pieces of spam, one of them will generate a complaint, and his account will be terminated. Also assume that most complaints are received fairly promptly, say within three days. Now, if a one time cost of $1 for account creation is imposed, and if senders are allowed to send up to 2000 messages over a 3 day period, any attempt to spam will in general incur a cost of at least 0.05 cents before account termination. For instance, a spammer can pay $1 and immediately send 2000 messages. Within three days, we expect a complaint to be generated, and the spammer's account will be terminated. This will have cost him 0.05 cents per message. However, a legitimate user can incur a one time cost of $1 and then send about 666 messages a day forever. Assuming that none of these legitimate messages generate complaints, the user's total volume will be unlimited, although his rate will be limited.

A similar analysis can be performed with HIPs or computational challenges. We can require one HIP for each 100 messages, up to 20 HIPs total, at a cost of 5 cents each ($1 total.) After 20 HIPs have been solved, we can allow up to 2000 messages in the past 3 days, as above. If the spammer initially solves 20 HIPs and sends 2000 spam, his account will be terminated, and the spam will have cost him 0.05 cents each (i.e., a lot). If he attempts to manipulate the system, by, for instance, solving 20 HIPs and sending 2000 good messages (perhaps to himself or a confederate), he will have sent 0 spam. He can send good messages as long as he wants, but as soon as he sends 2000 spam, someone will complain, his account will be terminated, and the cost will have been 0.05 cents per message. Thus, legitimate users incur a very low cost per message (assuming they send in large volumes in the long run) while spammers incur a high cost per spam. Thus, sender volumes can be limited to some number per challenge (or cost) up to some maximum, say 100 messages per challenge up to 20 challenges, and then sender rates be limited, to say, 666 messages per day.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
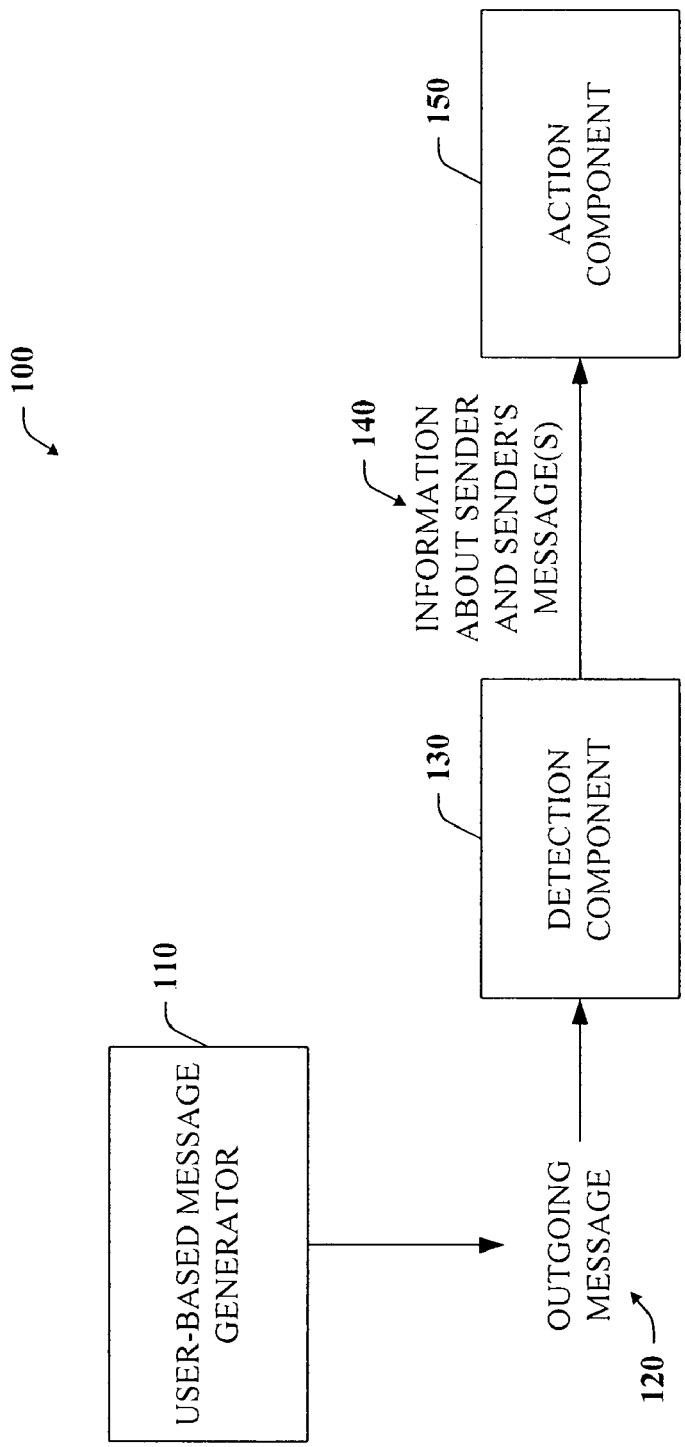
FIG. 1 is a general block diagram of a system that facilitates preventing outgoing spam in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating) training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above Furthermore, the term "recipient" refers to an addressee of an incoming message. The term "user account" can refer to a sender or a recipient making use of messaging systems to send and/or receive messages such as email, instant messages, chat messages, and/or whisper messages, depending on the context of its usage.

Referring now to FIG. 1, there is illustrated a general block diagram of a system 100 that facilitates the detection and identification of potential spammers. A sender can make use of a user-based message generator component 110 to create an outgoing message(s) 120. The outgoing message(s) 120 can be addressed to one or more recipients as desired by the sender.

Prior to the delivery of the outgoing messages to the respective recipient(s), a detection component 130 processes and analyzes the message(s) 120 to determine whether the message is likely to be spam and/or whether the sender is a potential spammer. Several techniques for detecting spammers via their outgoing) messages 120 exist. Ones approach involves monitoring the volume or rate of outgoing messages 120 per sender. Examining the volume or rate of outgoing messages per sender facilitates identifying potential spammers since most spammers tend to send messages more frequently than legitimate users over any given period of time. The time period can be every m minutes (where m is an integer greater than or equal to 1) or any number of hours, days, weeks, months, and/or years desired. For example, the volume of outgoing messages over a 10 minute period of time can be tracked every 10 minutes on a regular or otherwise scheduled basis. It is also feasible to compute the total number of outgoing messages ever sent (e.g., since activation of the account) per sender in order to identify a potential spammer.

A second and perhaps even more effective approach entails counting the number of recipients included on each outgoing message. Typically, legitimate users send man messages but to fewer recipients whereas spammers tend to send fewer messages to many different recipients. Recipients of a message can be listed in a "To:" field, a "cc:" field (carbon copy), and a "bcc:" field (blind carbon copy), for example.

Considering the volume of recipients per sender makes it more difficult for spammers to elude other account restrictions such as outgoing message limits. For example, spammers usually get around outgoing message limits by simply sending fewer messages, whereby each is addressed to as many recipients as possible. To mitigate this type of spammer behavior, each recipient of a message constitutes a separate message in accordance with one aspect of the present invention. In other words, one outgoing message with 20 recipients from Sender W can be counted as 20 outgoing messages from Sender W, for example. Thus, including recipient limits can be an effective approach to diminish and discourage spam activity.

Recipient limits are just another type of restriction in place, and inevitably, some spammers will attempt to find a way around it as well. For instance, spammers may send a large amount of messages repeatedly to a similar group of people to stay within the recipient maximum. In doing so, it may initially appear as if the spammers have succeeded in distributing their spam constantly and in large quantities. However, this trick actually is unsuccessful. This is because the group of recipients who continue to receive the same spam over the duration of a day, for example, eventually recognize and the message and stop opening the message. In addition, since the recipients are receiving a barrage of the same or similar messages from a particular sender, the recipients eventually learn that these messages are spam. Accordingly, with most email clients, they can easily black list the spammer. Therefore, sending lots of messages to the few same recipients appears to be much less effective for the spammer and thus, an unlikely strategy to pursue.

Another technique makes use of machine learning systems (MLS). Machine learning systems employ features or characteristics that are known to be found in spam or that are more likely to be found in spam than non-spam. Machine learning systems can also employ positive features such as those more likely found in non-spam than spam. The outgoing messages 120 can be processed by a machine learning filter (e.g., trained by a MLS) and then assigned a probability or score. The probability indicates that the message is more or less likely spam. For example, a higher probability signifies that the message is more than likely spam, whereas a lower probability signifies that the message is less likely spam (e.g., more likely non-spam). According to this example then, messages having a higher total score are more likely to be flagged as spam or potential spam.

Unfortunately, spammers have found ways to manipulate and/or trick spam filters into always assigning their messages with probabilities of 0 or near 0, for instance, so as to successfully pass through such filters. One aspect of the subject invention mitigates this tactic by assigning additional scores to substantially all of the outgoing messages. For example, a constant value (e.g., 0.1., 0.2, etc . . . ) or some minimum score can be added to the filter probability or any other score previously assigned to the messages. By adding this constant value, the detection component can verify that the sum of scores is increasing at some reasonable rate; that is, by a factor of 0.1, 0.2, etc.

Alternatively or in addition, scores can be assigned to each outgoing message based at least in part upon some content of the outgoing messages. For example, URLs (Uniform Resource Locator) are more commonly found in spam than in legitimate messages. Hence, outgoing messages which are determined to include at least one URL anywhere in the message can be assigned a higher score (e.g., 2) than messages not including a URL (e.g., some score less than 2). Other contact information such as telephone numbers included in a message are more likely to be found in spam than non-spam. This is because most spam contains some type of contact information such as a telephone number, for example. The telephone number or at least a portion thereof (e.g., area code and/or prefix) can provide information about the sender of the message. Therefore, such messages can also be assigned a higher score since they are more likely to be spam.

Although several different scoring methods have been described hereinabove, it should be appreciated that any combination of scoring can be employed and that making use of machine learning systems is merely one option available to the system 100. Other rule-based systems can also be utilized to carry out the subject invention. For instance. the filter may be a rule-based system, a fuzzy hash system, etc. If the filter can produce probabilities, these can be used in lieu of the machine learning system probabilities. If the filter can produce scores, these can also be used. Even if the filter can only produce "spam"/"not spam" guesses, these can be converted to 1/0 scores, and used.

As another alternative or in addition to scoring, we may assign scores based on the number of recipients of messages that cannot be reached. A large number of failed delivery attempts is indicative of spam. These failures can occur at message delivery time, or also as NDRs (non-delivery receipts), which are error reports sent back to the sender's system. One downside of this technique is that some users will be victims of spammers sending spam in their name, leading to NDRs that are not actually from the user. Thus, it can be useful to verify that the message is actually from the sender. This can be done, for instance, by keeping track of recipients of messages from the user, or by keeping track of messages sent by the user. A large score can be assigned for each non-deliverable recipient. If we are keeping track of each recipient of messages from the user, we can verify that any NDR was to a user who the user actually sent mail to. Infra, we describe a technique that involves keeping track of only one out of every k recipients. If we are using that technique, we can multiply out non-delivery penalty for NDRs by a factor of k.

Spammers are unlikely to send legitimate mail. We may therefore decide that users who send large amounts of legitimate mail and small amounts of spam-like mail are likely to be legitimate. We can therefore keep track of the amount of apparently legitimate mail sent by users, and include a "bonus" for sending legitimate mail. For instance, we could assign a bonus of 0.1 points for each legitimate message. We can assume that messages given a sufficiently low score by a spam filter are likely to be legitimate. Spammers may attempt to exploit this technique by sending legitimate mail. We therefore may want to limit the potential bonus, to some maximum amount.

Still referring to FIG. 1, the detection component 130 can further process each outgoing message by computing a sum of all scores assigned to substantially all messages from a given sender, such as for a particular duration of time to facilitate determining whether the respective sender is a potential spammer. The determination can be made at least in part upon comparing the score to a threshold value. Threshold values can vary by sender; however, when the threshold is exceeded, the sender can be determined to be a potential spammer.

In order to verify whether the potential spammer is a true spammer, any information 140 such as individual scores, total score, sender information, and/or message excerpts characteristic of or known to be spam, for example, associated with the outgoing message(s) can be communicated to an action component 150.

The action component is operatively coupled to the detection component 130. Based at least in part upon the information 140 received from the detection component 130, the action component 150 can assess and initiate an appropriate type of action against the potential spammer. Exemplary types of actions include human inspection of a sampling of outgoing messages (per sender), requesting a sender's response to messages generated by the action component, and/or suspension of message delivery (e.g., permanent or temporary). Any action initiated by the action component effectively mitigates spamming either directly by affecting the sender's ability to generate and send messages or indirectly by making it less cost-effective and thus more expensive for the spammer to send spam messages through the subject user account(s), or both.

Figure 2:
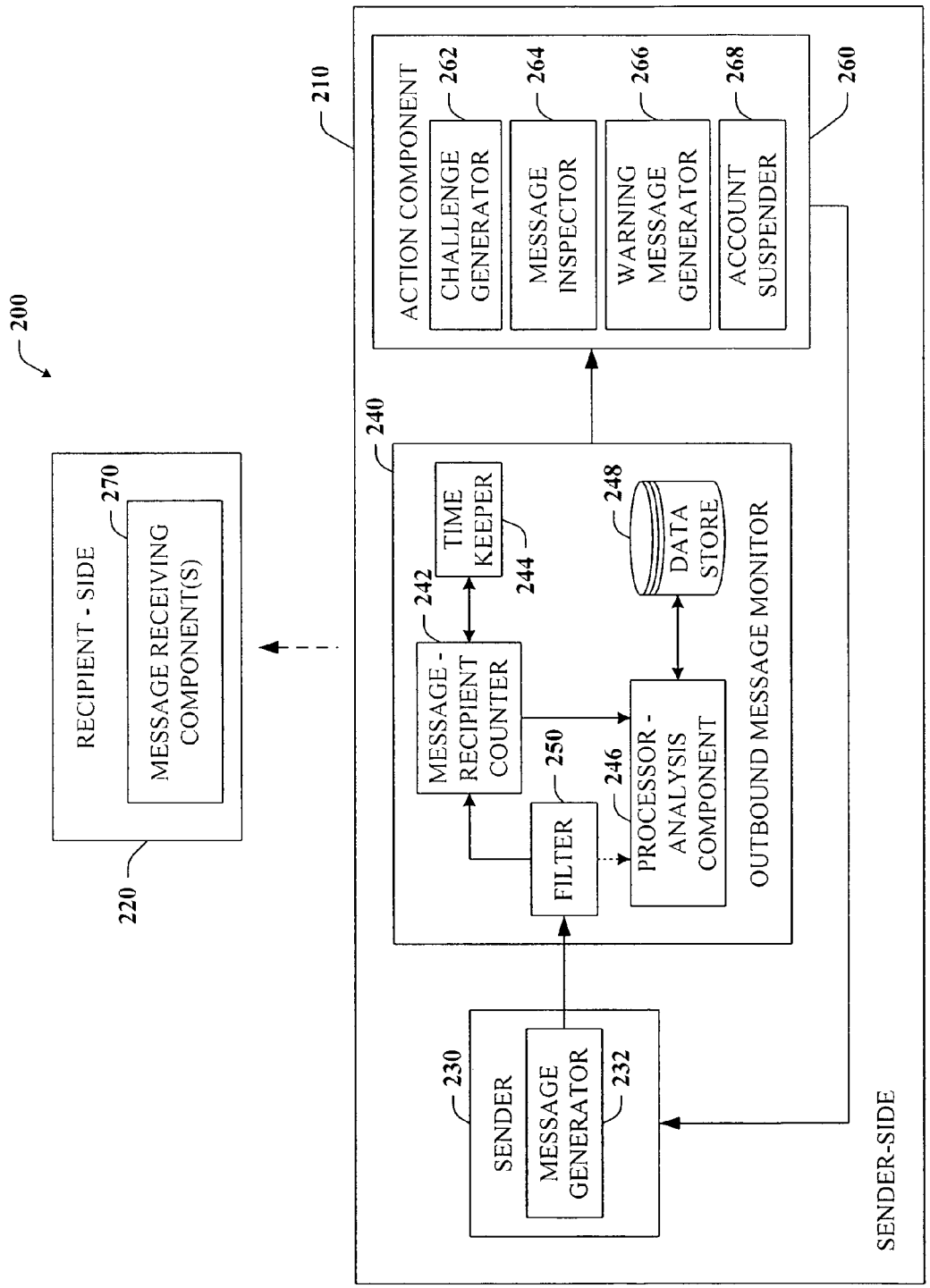
FIG. 2 is a block diagram of a system that facilitates identification of potential spammers by monitoring outbound messages in accordance with an aspect of the present invention.

Referring now to FIG. 2, there is illustrated a block diagram of an outgoing message spam detection system 200 in accordance with an aspect of the present invention. The system 200 includes a sender-side aspect 210, wherein outgoing messages are created and processed prior to delivery, and a recipient-side aspect 220, wherein outgoing messages are delivered to their intended recipients.

The sender-side 210 comprises at least one sender 230 making use of a message generator 232 or other messaging system wherein outgoing messages can be created. Examples of messages include email messages, instant messages, chat room messages, and/or whisper messages (e.g., similar to instant messages but between two people in a chat room). Once created, the outgoing message can be communicated to an outbound message monitor 240, and specifically passed through one or more filters 250. The outbound message monitor 240 comprises a message-recipient counter 242 that can track a volume of outgoing messages per sender as well as a volume of recipients per sender (or per message per sender). The message-recipient counter 242 can be operatively coupled to a time function component 244 that can compute a volume of outgoing messages per sender over any desired duration of time.

The duration can be previously determined to effectively monitor the volume of Outgoing of messages for at least one (e.g., daily) or multiple units of time (e.g., hourly, daily, and monthly). In one instance, the number of outgoing messages could be recorded over a five-minute time span (e.g., 10 messages per 5 minutes), a one hour time-spam, and/or on a per day basis (e.g., 300 messages per day by the sender 230).

Information generated by the message-recipient counter 242 as well as the time function component 244 is communicated to a processor-analysis component 246. The processor 246 processes and analyzes the information concerning the outgoing) message to compute outgoing message rates and to track recipient and outgoing message volumes per sender. Data corresponding to each sender can be maintained in and/or retrieved from a data store 248 by the processor 246.

As shown in FIG. 2, substantially all outgoing messages are passed through at least one filter 250 and then either passed directly to the processor component 246 for analysis or passed on to the counter 242. The filter 250 can assign some score or probability related to the contents of each message. More than one score can be assigned to each message depending on the number and types of filters 250 through which each message is passed. For example, one score may be an MLS probability. Another score may be a constant such as 0.1. Yet another score may be an indicator that the message contains a URL (e.g., 1.0). The processor 246 can compute a sum total of all scores per message and/or a sum of all message scores per sender. In addition, a score based on a list of recipients per sender can also be maintained. These lists can be updated, discarded, and created de novo as desired by the system 200. Maintaining such dynamic lists of recipients per sender can be informative in identifying potential spammers since most legitimate users usually send more mail to fewer recipients while most spammers tend to send fewer messages to many different recipients.

Once a sender's score and/or total score (e.g., for one outgoing message or for many outgoing messages) exceeds a given threshold, the monitor 240 can signal a disciplinary component 260. The score threshold for one outgoing message can be higher than the set threshold for many outgoing messages. Similarly, the score thresholds can vary among senders. Each sender's threshold information can be stored in and retrieved from the data store 248.

The disciplinary component 260 is activated when a potential spammer has been identified by the outbound message monitor 240. At least the sender's contact information is communicated to the disciplinary component 260. Other information that can also be provided to the disciplinary component 260 includes the sender's scores (e.g., sampling of individual message scores, total score, and/or scores obtained on a weekly basis over a four week period, etc.). The disciplinary component 260 can assess the degree of certainty that the sender is a spammer by weighing the score information, for example. Based at least in part upon this degree of certainty, several options are available to the disciplinary component 260 to facilitate determining whether the sender is a spammer or to facilitate providing some degree of certainty that the sender is not a spammer.

One option involves a challenge generator 262 that can generate and transmit one or more challenges to the sender (e.g., sender account). The account would be required to respond in some way to the challenge before any other outgoing messages could be sent. Alternatively, some maximum number of messages can be sent from the account while waiting for a response to the challenge(s).

Challenges may be delivered to the account as a message to the account user such as in the form (e.g., email, whisper, chat, instant message) of the sender's outgoing message or as a pop-up message (e.g., especially if the sender uses a client the system 200 has control over) at message sending time (e.g., when the sender attempts to send his outgoing message). Challenges may be in the form of human interactive proofs (HIPs) and/or computational challenges. HIPs can be easily solved by a person but not by a computer, whereas computational challenges can be easily solved by a computer; hence, human attention may not be required when computational challenges are selected as the challenge.

In addition to exceeding a threshold level relating to spam-like behavior, challenges can be sent to a user account for other various reasons. For instance, they may be necessary as a way to monitor user behavior to verify that spam-like activity is not occurring. This is because spammers can try to fool machine learning filters by initially sending legitimate messages and then later sending mostly spam messages. In order to monitor user behavior in this manner, the user account and/or client can be required to resolve a challenge after every n outgoing messages (wherein n is an integer greater than or equal to 1). Challenges can also be sent in response to feedback from a server that a shutdown of the account is coming close. In this case, a filtering system on the server may have observed spammer-like activity or behavior associated with a particular account. For similar reasons and in a similar manners challenges can be sent after r recipients are counted from the outgoing messages of each sender (wherein r is an integer greater than or equal to 1). The recipients can be counted either once per message, e.g., the same recipient on two messages Counts as two recipients, or uniquely, e.g., the same recipient on two messages counts as one recipient.

In some instances, the sender may never be aware of any challenges sent thereto, particularly when the client is responding automatically to them without needing human attention or action. However, if the client and/or user do not respond and repeated attempts at sending outgoing messages are made, the account may receive a message notifying it that a response is required to continue use of the account. As long as the challenges are answered correctly and/or in a timely manner, outgoing) messages are allowed to be sent from the account.

A second option involves human inspection of a sampling of the sender's outgoing messages by a (human-operated) message inspector 264. Since the behavior of some legitimate account holders can resemble spammer conduct (e.g., multiple recipients per message, many messages, and/or higher volume and rate of messages such as by organization mailing lists, family-friends distribution lists, etc.), it can be useful to manually inspect a sampling of a sender's mail so as to mitigate punishing a legitimate sender by constantly interrupting the delivery of their outgoing messages. When the sender is determined to be a legitimate user, the sender's scores can be reset and/or their threshold levels can be increased so that they will, at a minimum, be less frequently flagged as a potential spammer.

A perhaps more stringent option involves sending the potential spammer a legal notice regarding the messaging service's user and spam policies and terms of service. The legal notice can also serve as a warning to the potential spammer that he/she is in violation of such policies and/or the terms of service. Providing this type of notice may make it easier to take legal action against the spammer. The delivery of outgoing messages to their intended recipients 220 (e.g., message receiving component 270) can be temporarily suspended or the account can be immediately shut down until the sender acknowledges receipt and reading of the legal notice. The legal notice can be communicated to the sender as a message to the account such as in the form (e.g., email, whisper, chat, instant message) of the sender's outgoing message or as a pop-up message (e.g., especially if the sender uses a client the system 200 or message service has control over) at message sending time. Alternatively, the sender may be allowed to send a small number of messages before suspending the account operation and before being required to respond to the message.

In some instances, there can be a high degree of certainty that the sender is a spammer. In such cases, the account can be temporarily or permanently suspended or shut down by an account suspender component 268. The account suspender component 268 can also operate cooperatively or in conjunction with one or more of the other options (e.g., 262, 264, and 266). High certainty can be based at least in part upon a high MLS probability assigned to at least one outgoing message. Alternatively or in addition, when there is an exact match or a near match of the sender's message(s) to previously known spam or when the message contains a phrase that a human has decided is spam like (e.g., a link to a web page used by spammers).

Moreover, any combination of the above options can be implemented by the system 200 depending on the sender's scores and the sender's response to a previously delivered option.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 3:
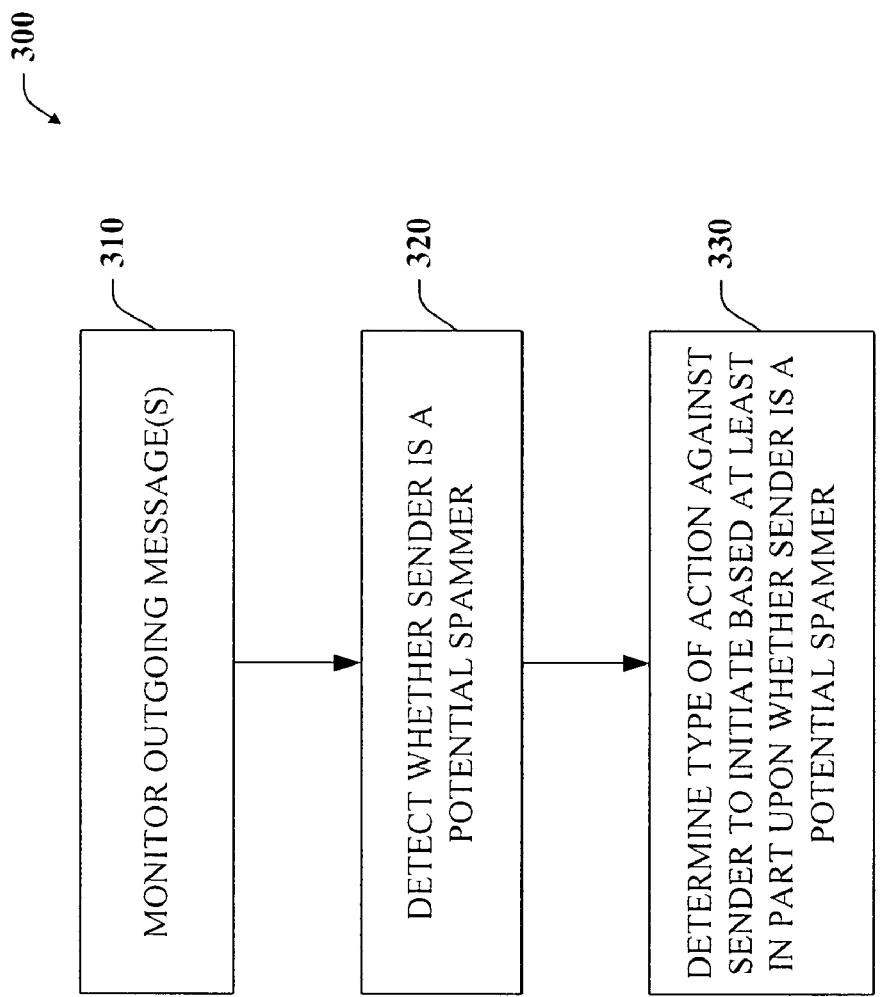
FIG. 3 is a flow diagram of an exemplary method that facilitates identifying and preventing outgoing spam in accordance with an aspect of the present invention.

Turning now to FIG. 3, there is a flow diagram of a process 300 that in general facilitates detection of potential spammers in accordance with an aspect of the present invention. The identification process 300 involves monitoring substantially all outgoing messages 310 per sender at 310. The monitoring can involve tracking a volume and/or rate of outgoing messages per sender. In addition, a volume of recipients listed per message per sender can also be tracked and recorded. According to one aspect of the instant invention, each recipient on a message constitutes one message. Thus, if an outgoing message lists 25 recipients, then that particular message would be counted not as 1 but instead as 25 individual messages since 25 recipients were to receive it.

Furthermore, the monitoring can also be performed by tracking scores per message per sender, merely per sender, and/or by recipient per sender such as over a period of time, wherein recipients are counted either per message, or uniquely (same recipient on two messages counts as one). Such scores can be assigned by MLS filters, other rule-based filters, and/or other content-based filters. For example, a MLS filter can assign a probability based on a level of spaminess exhibited by at least a portion of the message. Other rule-based filters can assign similar types of scores that depend at least in part on some content of the message. Finally, content-based filters can look for spam-like phrases or known spam phrases in the outgoing messages. A match or near match can cause the message to be flagged for further investigation or inspection to thereby detect if the sender is a potential spammer at 320. If any one or a combination of these results indicates spam-like conduct and/or exceed threshold levels, the process 300 can determine at 330 what type of action should be initiated against the potential spammer to, at a minimum, confirm or verify that the sender is in fact a spammer.

Alternative measures can also be taken in the event that the sender is verified to be a legitimate user despite his/her spam-like messages. For instance, the sender's scores could be reset and/or the threshold levels for the sender could be adjusted so as to mitigate future disruptions of the delivery of the sender's outgoing messages.

Figure 4:
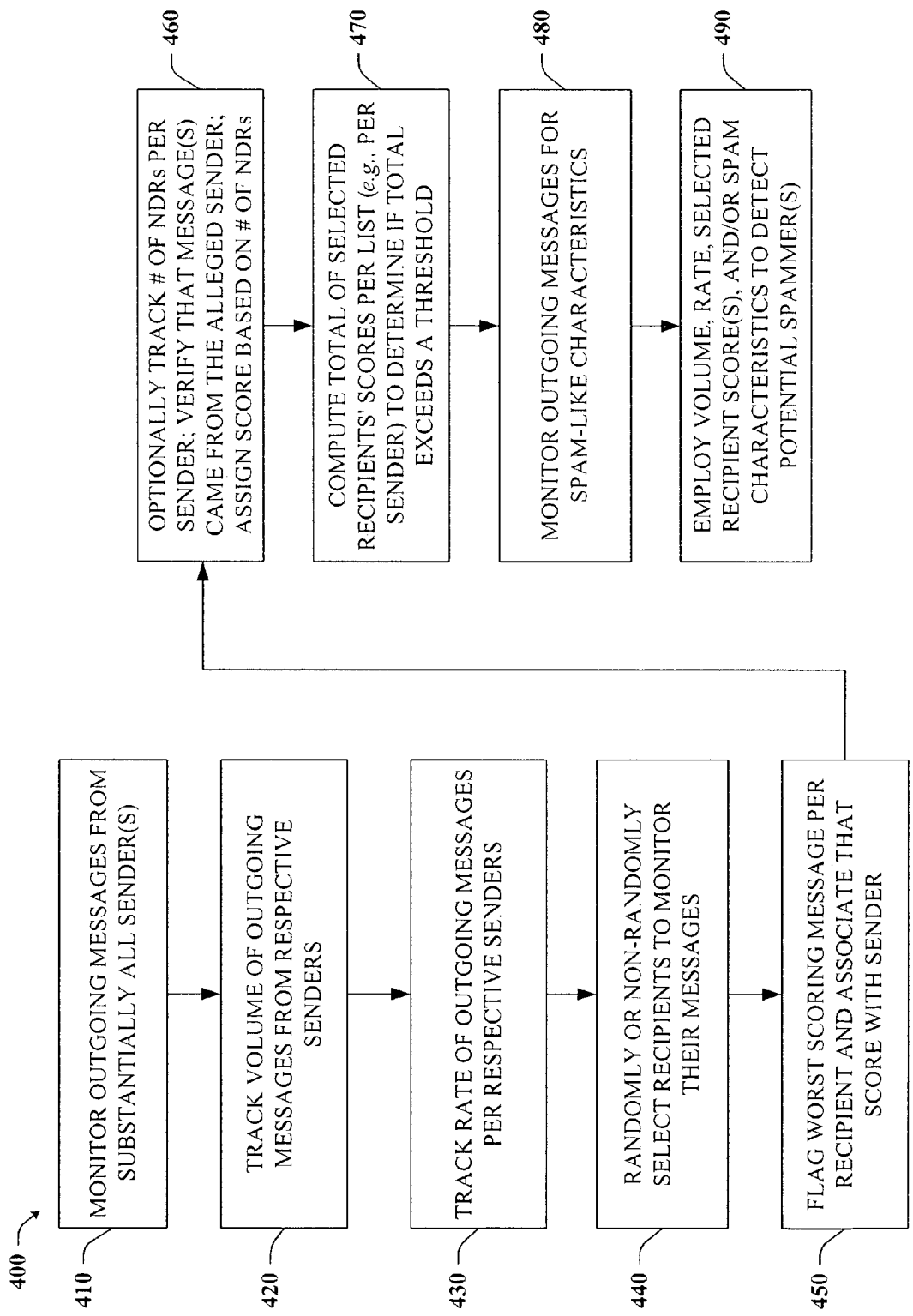
FIG. 4 is a flow diagram of an exemplary method that facilitates identifying and preventing outgoing spam in accordance with an aspect of the present invention.

Referring now to FIG. 4, there is illustrated a flow diagram of an exemplary spam detection process 400 that facilitates tracking particular recipients of messages in accordance with another aspect of the present invention. The spam detection process 400 involves monitoring outgoing messages from substantially all senders or accounts (at 410) as they are being processed for delivery to the respective recipients. A number of techniques can be implemented to facilitate identifying potential spammers during the monitoring at 410. For instance, at 420, the volume of outgoing messages from respective senders (e.g., per sender) can be counted and tracked. In addition, the volume of recipients (e.g., distinct recipients) per sender can also be counted and tracked. It should be appreciated that each recipient listed on a message counts as one message so that the message count and the recipient count should be similar if not equal to each other.

As the volume of messages and recipients is being monitored, a rate of outgoing messages per respective sender can also be recorded at 430. Outgoing message volume and rate data can be converted to scores to facilitate assessing the behavior of each sender. Alternatively, the volume and rate data can be utilized in its unconverted state.

As depicted in the figure at 440, recipients of the outgoing messages can be randomly or non-randomly selected and placed on a list(s) such as, for example, a list of recipients by sender. Accordingly, when a message is sent to a recipient on the list (referred to as a selected recipient), that message becomes associated with that recipient for tracking purposes. For instance, it could be desirable to track the higher scoring messages associated with a selected recipient as well as the worst scoring message received by the recipient. The worst scoring (e.g., most spam-like) message received by the selected recipient can then be used as the score associated with a particular sender for that recipient (at 450).

Because spammers are more likely than legitimate users to send messages to invalid mailboxes (e.g., nonexistent email addresses), they are more likely to receive a higher number of non-delivery receipts. Thus, a sender having a relatively large number of failed delivery attempts can be indicative of a potential spammer. In light of this attribute, optionally at 460, a number of non-delivery receipts (NDRs) can be tracked per sender; and verification that the message(s) actually came from the purported sender can also be performed. One technique to verify that the message(s) came from the alleged sender involves keeping track of recipients of messages from the sender and/or keeping track of messages sent by the sender. Following, a score can be assigned based at least in part upon the number of NDRs received per sender.

Alternatively, senders who send mostly legitimate messages and a relatively small amount of spam-like messages can be rewarded with a bonus. For instance, the bonus can be in the form of a favorable adjustment to the sender's score.

Thereafter at 470, a total of all selected recipients' scores for a certain list (e.g., per sender) can be computed. Again, if the total score exceeds a threshold, then the sender is flagged as a potential spammer and further action can be taken to examine the spam-like conduct of the sender.

By using only the worst score associated with the sender instead of a total score of all messages from the sender (to the selected recipient), recipients who have not received spam-like messages from the sender are not counted against the sender. Further discussion on tracking randomly selected recipients and their messages is discussed, infra, in FIG. 6.

Still referring to FIG. 4, the outgoing messages can also be processed through one or more filters at 480 in order to look for spam-like characteristics in the respective messages. For instance, messages including a URL are more spam-like. Thus, a message having a URL may be assigned a score higher than, for example, a message having no URL. It should be appreciated that the processes occurring with respect to 420, 430, 440, and 480 can take place in any order and/or can at least partially overlap each other.

In general, the scores are calculated to result in a total score per message and/or a total score per sender (e.g., sum of scores for all respective messages by sender) and then compared to respective threshold levels at 490 to facilitate detection and identification of a potential spammer.

In addition to monitoring the volume and the rate of outgoing messages, it can be useful to keep track of how many different recipients a sender has or has had. As the number of recipients increases, the more likely it is that the sender is a potential spammer. This is because legitimate users usually send lots of messages to relatively few recipients; whereas the converse is typically true of spammers. That is, spammers tend to send fewer messages to several different and distinct recipients.

Figure 5:
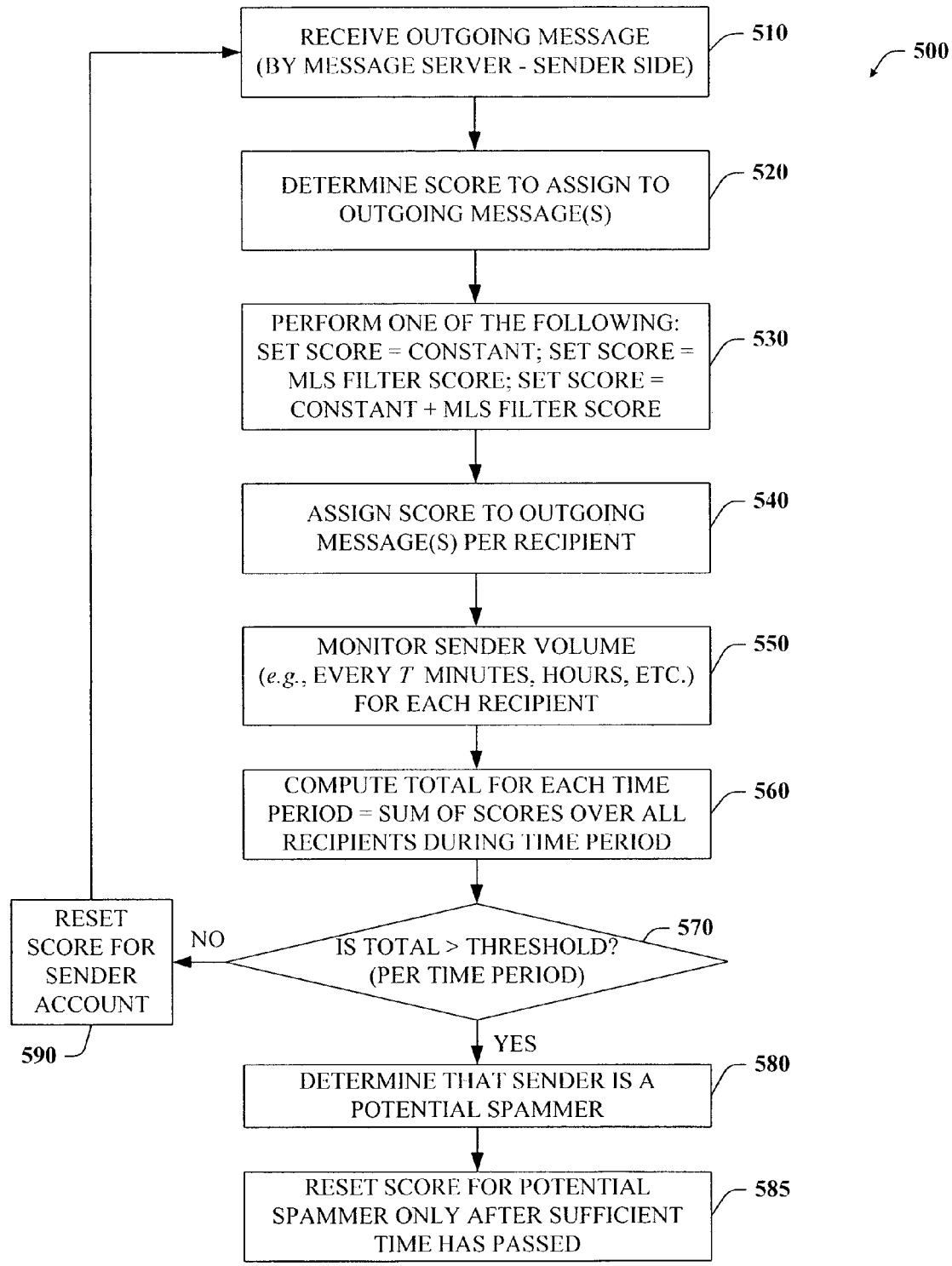
FIG. 5 is a flow diagram of an exemplary method that facilitates identifying potential spammers in accordance with an aspect of the present invention.

Referring now to FIG. 5, there is illustrated a flow diagram of an exemplary method 500 for monitoring outgoing messages according to the corresponding respective recipients. The method can begin at 510 where an outgoing message(s) is received by a message server (e.g., on the sender side). The message server or some other component can be programmed to create a list of outgoing messages for each recipient. At 520, a score for each outgoing message can be assigned and associated with the corresponding recipient. The score assigned to each outgoing message can be independently determined, for example, by performing a logic operation to determine the most desirable score to assign to the particular outgoing message.

For instance, at 530, the score could be set to a constant value. When setting a constant value score to each outgoing message per recipient, the recipient's score (e.g., assuming more than one outgoing message is listed for the recipient) should increase at a rate commensurate with the constant value. Therefore, any deviation therefrom can be attributed to one or more senders' attempts to manipulate scoring systems. Such messages and their respective senders can be isolated and identified as at least potential spammers.

Alternatively, the score assigned to the message can be a probability value (e.g., MLS probability). The probability may be based on the MLS assessment of the outgoing message; that is, the probability reflects the likelihood that the outgoing message is spam or that the sender is a potential spammer.

Moreover, the score assigned to each outgoing message may be a combination of the MLS probability and the constant value. Although more than one scoring option is available, it should be appreciated that the scoring option should be consistent for the group of outgoing messages being processed so that they can be compared to one another using a similar scale and point of reference. However, the scoring option can be changed as long as the change is consistent for substantially all of the outgoing messages.

The outgoing messages are tracked and recorded for each recipient. In addition to the above scores, the volume, rate, and/or frequency of messages sent to each recipient can be monitored and tracked as well (at 550). For instance, if the duration, rate, and/or frequency of messages sent to any recipient exceed a corresponding given threshold, a score can be added at 540 to the recipient's list to reflect such.

At 560, a total score over substantially all recipients for this sender during the relevant duration can be computed. Alternatively or in addition, the highest scoring outgoing message per recipient for this sender can be tracked, and used as part of computing the total score, to facilitate identifying the sender as a potential spammer.

If the total score exceeds a threshold (at 570), then it can be determined that the respective sender is a potential spammer at 580. Similarly, if a highest scoring message exceeds a threshold, it can also be concluded that its sender is at least a potential spammer at 580. The score associated with the potential spammer can be reset only after a sufficient amount of time has passed at 585. The amount of time needed to pass for the score to be reset and the delivery of outgoing messages from that sender to resume depends at least in part on the spammer's score relative to the threshold. That is, enough time has to pass to bring the spammer is score below the threshold.

On the contrary, if the total score associated with the sender for a given duration or an individual message score does not exceed the respective threshold, the score can be reset for the sender, as is appropriate at 590, and the method 500 can be repeated at 510.

As previously mentioned, limiting the number of recipients that a sender can send messages to can be an effective approach to mitigate spam or spam-like activity. Limits based on the number of unique recipients from the sender (each recipient counted once per sender) affect spammers more than legitimate senders; limits based on the number of recipients per message are more effective than those based on the number of messages (since spammers can send one message to very many recipients.) Furthermore, it would be desirable to not only account for a total volume of recipients in a duration (e.g., every minutes, hours, days, weeks, years, etc.) per sender, but it would also be advantageous to track the most spam-like messages sent to recipients.

Unfortunately, tracking every recipient and that recipient's intended messages can be expensive because every recipient would need to be tracked (e.g., to assign scores per sender based on the total number of distinct recipients and scores per recipient per sender). Therefore, rather than keeping track of every recipient, a randomized technique can be employed to yield similar results. For instance, imagine that there is a maximum of n recipients (e.g., n is an integer greater than or equal to 1) but merely 1/k (k is an integer greater than or equal to 1) of the recipients are to be tracked (via a list(s)). Then, when a n/k of the recipients have been seen, it can be assumed that the maximum has been reached; or a safety factor can be included to make sure with high probability that the maximum has been reached.

To facilitate this randomized recipient tracking process, hashing can be employed. Hashing is the transformation of a string of characters into a usually shorter-fixed length value or key that represents the original string. Hashing is used to index and retrieve items in a database or list form because it is faster to find the item using the shorter hashed value than to find it using the original value. A hash function can be computed for each recipient's identity information (ID such as an email address) to yield hash values for each recipient. Recipients are randomly selected by comparing for a match using the hash values. In the present example, a recipient is selected for tracking if the value of the hash modulo k is 0. Therefore, when the list contains n/k unique recipients, then it can be determined that there have been approximately n recipients per sender. The hash function can depend on a random factor on a per-sender basis to make it more difficult for spammer's to exploit this aspect of the invention.

Figure 6:
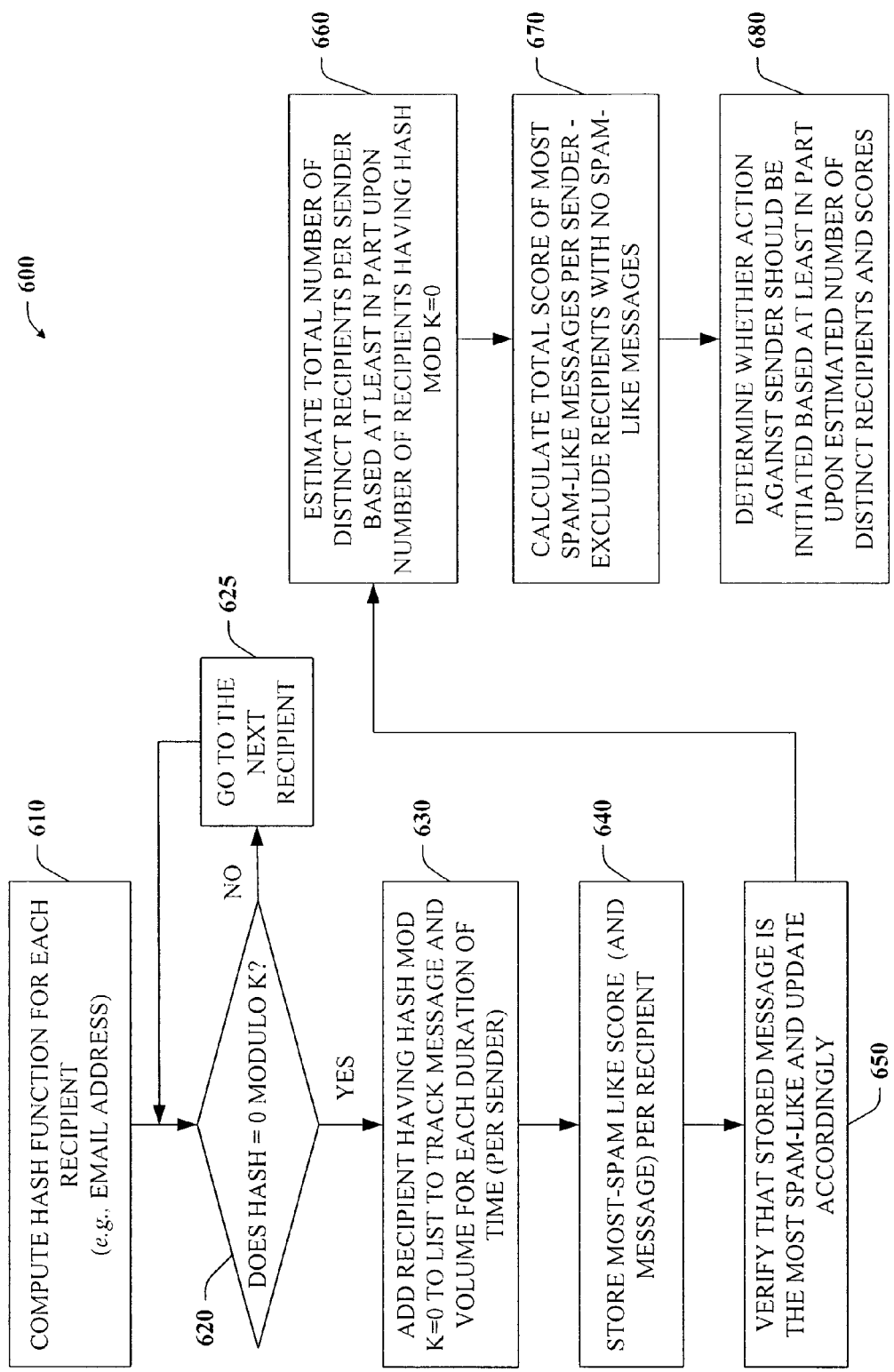
FIG. 6 is a flow diagram of an exemplary method that facilitates identifying potential spammers in accordance with an aspect of the present invention.

FIG. 6 illustrates a flow diagram of an exemplary randomized technique 600 that facilitates tracking ever), 1/k of the total recipients to estimate a total volume of distinct recipients per sender. At 610, a hash function of each recipient ID can be computed. Each time an outgoing message is sent to an identified recipient, the same hash is used for the particular recipient(s). Thus, some recipients are tracked and some are not.

At 620, a hash value is computed using the same hash function used to identify the recipient and then compared for a match using that value. In the current example, a hash of (recipient) modulo k is compared to some random value, such as 0. Thus, if a recipient has a hash value of 0 and a match is made, then that recipient will be added to a list for message tracking at 630. It should be appreciated that the hash modulo k can be compared to any random value as necessary to mitigate spammers from manipulating and deciphering this technique. However, if the recipient does not have a hash value equal to 0, then the next recipient is checked at 625.

In practice, imagine that a sender attempts to send 10,000 messages and the (distinct) recipient limit per day is 100. Now recall that 1/k of the recipients are to be tracked, wherein k=10 in this example. Thus, the sender sends the message to the first people. Of those 10, typically one is in the hash, which means that 1 out of the 10 recipients has a hash modulo k value equal to 0. The recipient in the hash is selected and added to a list for message tracking.

The sender sends the message to another 10 recipients. Again, of those 10, 1 recipient out of the 10 has a hash modulo k value equal to 0. Therefore, the recipient in the hash is also selected and added to the list for message tracking. After some time of sending, 10 people are in the hash or, in other words, have hash values equal to 0, and are selected and added to a list for message tracking. Accordingly, it can readily be computed that the sender has sent outgoing messages to at least 10 distinct recipients and probably more likely to about 100 distinct recipients (e.g., at 660)—since there are 10 recipients on the list (who have hash values equal to 0).

In addition, for each selected recipient, the most spam-like messages can be scored and these scores can be associated with the respective senders. For example, at 640, the most spam-like score and message can be stored per recipient per sender. Periodically or otherwise at 650, the stored message and score can be compared to other messages and scores to verify that the most spam-like message per recipient per sender is stored. The stored information can be updated accordingly. Isolating the most spam-like message can be used in addition to looking at substantially all messages sent to the recipients. With this strategy, recipients who have not received spam-like messages are not counted against the sender.

Alternatives to the above exist, however they can be problematic. One alternative involves looking at the average spam score for each recipient, but this would allow an attack in which spammers sent several innocuous messages, and one spam like message, keeping the average low. Such an attack is especially annoying to users, since the innocuous messages are likely to not be obvious spam, and thus to confuse the user and waste him time. It is therefore important to discourage this attack. Another alternative is to take the sum of the spam scores for each recipient for the given sender. When summed across recipients for a given sender, this would be the same as the sum of the spam scores across all recipients, which can be a useful measure; however, this measure does not require keeping any per recipient information. Also, sum measure does not take advantage of the fact that spammers tend to send to many recipients, while good users send to few; the maximum value does use this fact. Finally, the sum also does not take advantage of the fact that users are likely to complain if spammers send them many messages.

At 670, a total score of the most spam-like messages sent to each recipient by the given sender can be calculated to ultimately determine whether action should be taken against the sender. Other factors such as the estimated volume of recipients can also be considered in the determination at 680.

Figure 7:
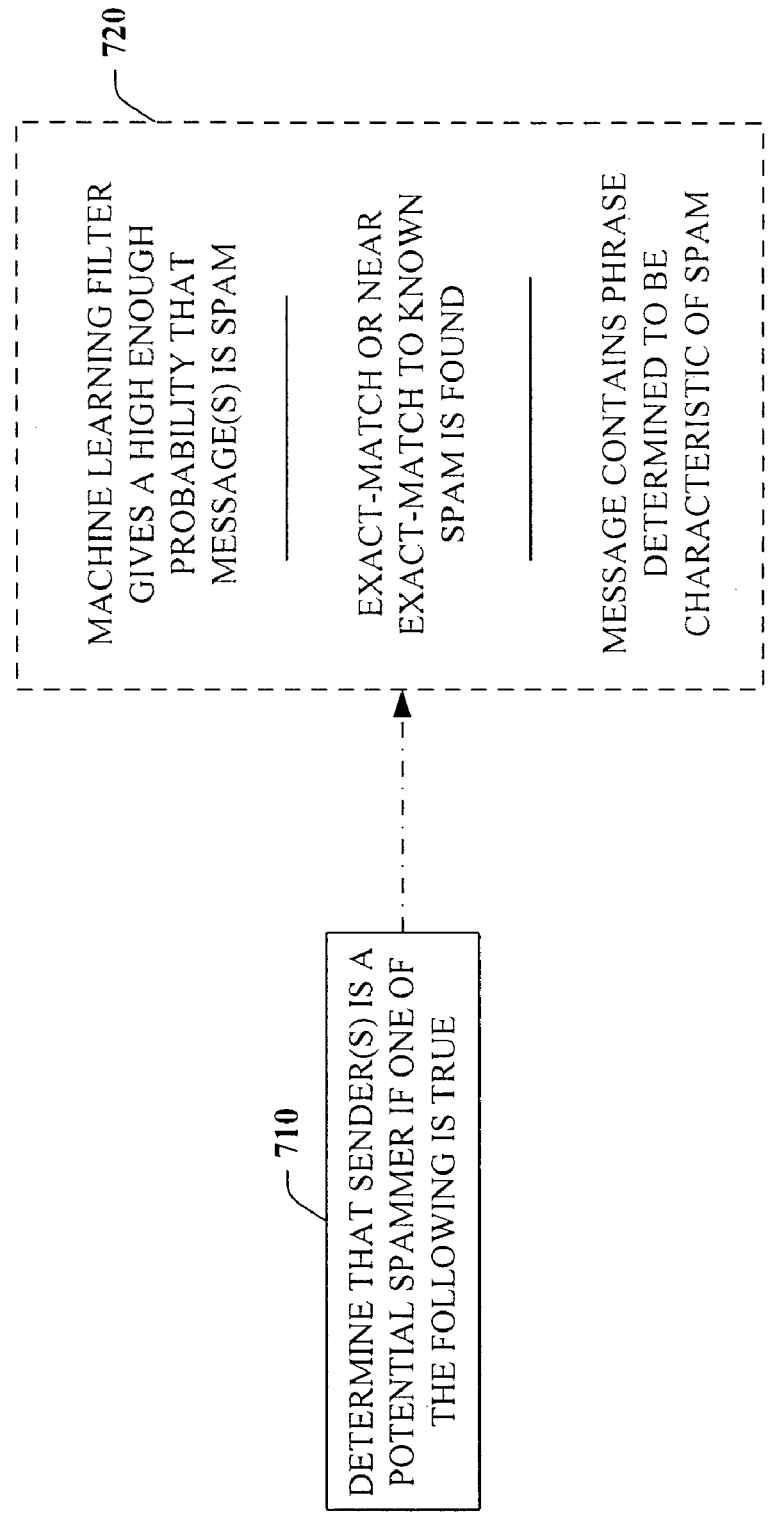
FIG. 7 is a flow diagram of an exemplary method that facilitates identifying potential spammers in accordance with an aspect of the present invention.

In addition to the various techniques discussed in FIGS. 4-6 supra, FIG. 7 provides additional factors that can be employed independently or in conjunction with the other techniques to determine that a sender is a potential spammer. More specifically, a sender is found to be a potential spammer (at 710) if at least one of the following is true at 720: a spam filter gives a high enough probability that a message(s) is spam: an exact match or near exact match to known spam is found—with respect to at least a portion of the message; and a message includes a phrase determined to be characteristic of spam. The filter probability can be ascertained as being "high enough" by comparing it to some threshold level. The amount over which the probability exceeds the threshold level can be one indication of "high enough".

Figure 8:
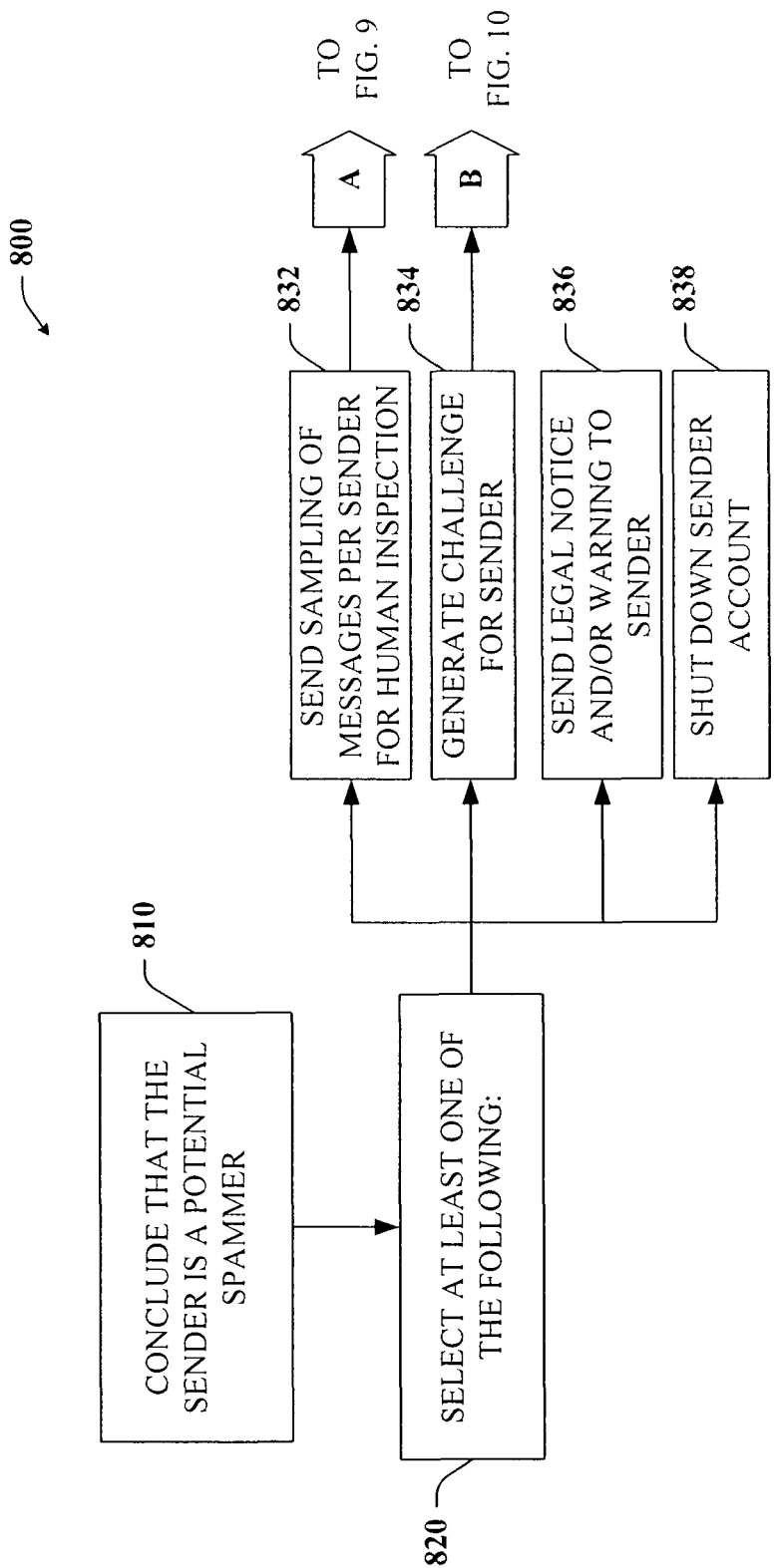
FIG. 8 is a flow diagram of an exemplary method that facilitates taking action against potential spammers in accordance with an aspect of the present invention.

Once it has been determined that a sender is or could be a potential spammer, various actions can be taken against the sender and/or the sender's user account to either verify that the sender is in fact a spammer, to warn the sender regarding continued spam activity, and/or adjust threshold levels for legitimate users that exhibit spam-like behavior. FIG. 8 demonstrates a for diagram of an exemplary reaction process 800 that can be implemented upon a determination that a sender is more likely to spammer-like behavior. The process 800 can begin at points where FIGS. 3-7 apparently end, as depicted at 810 in the current figure.

Figure 9:
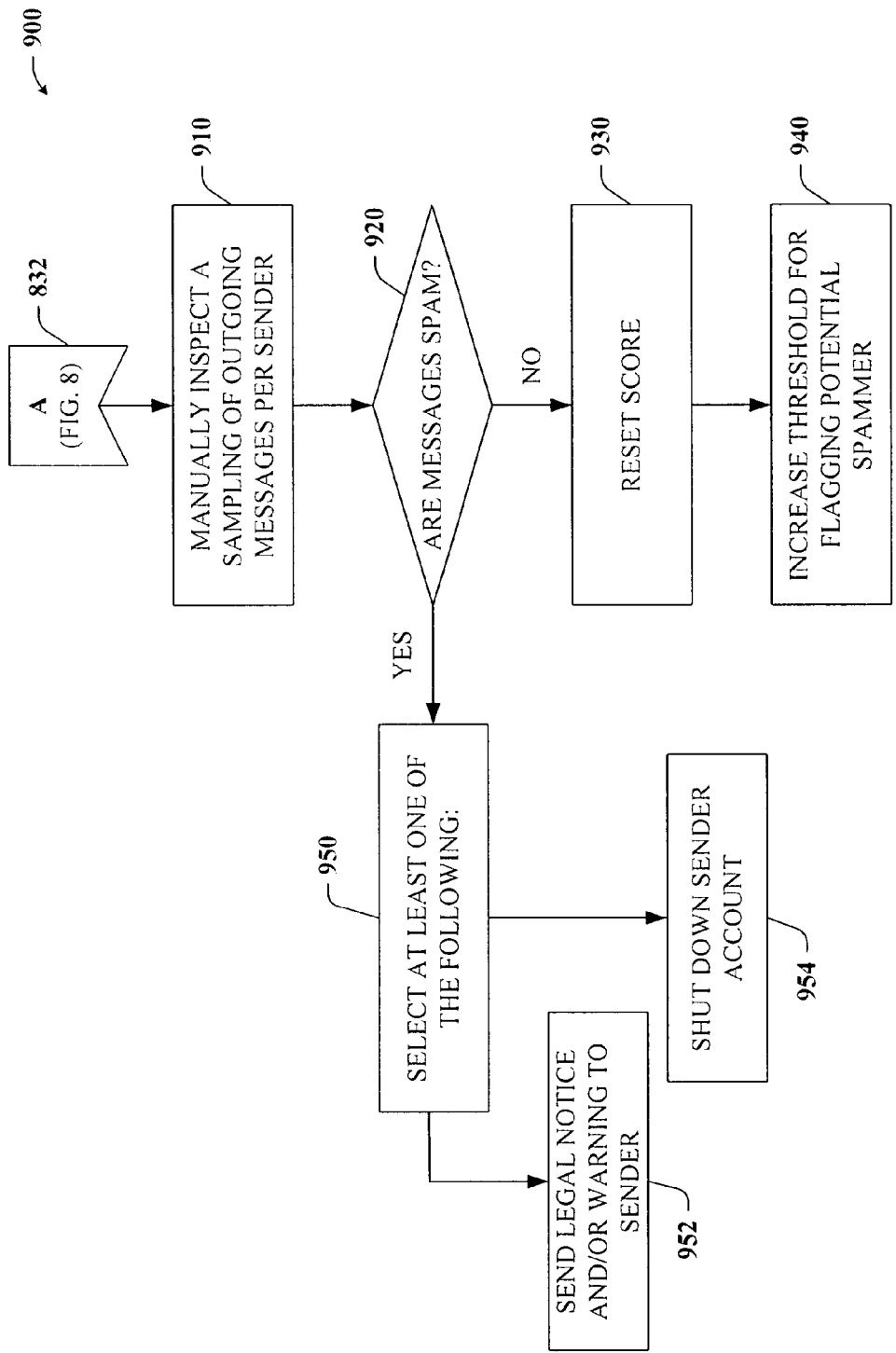
FIG. 9 is a flow diagram of an exemplary method that facilitates verifying potential spammers in accordance with an aspect of the present invention.
Figure 10:
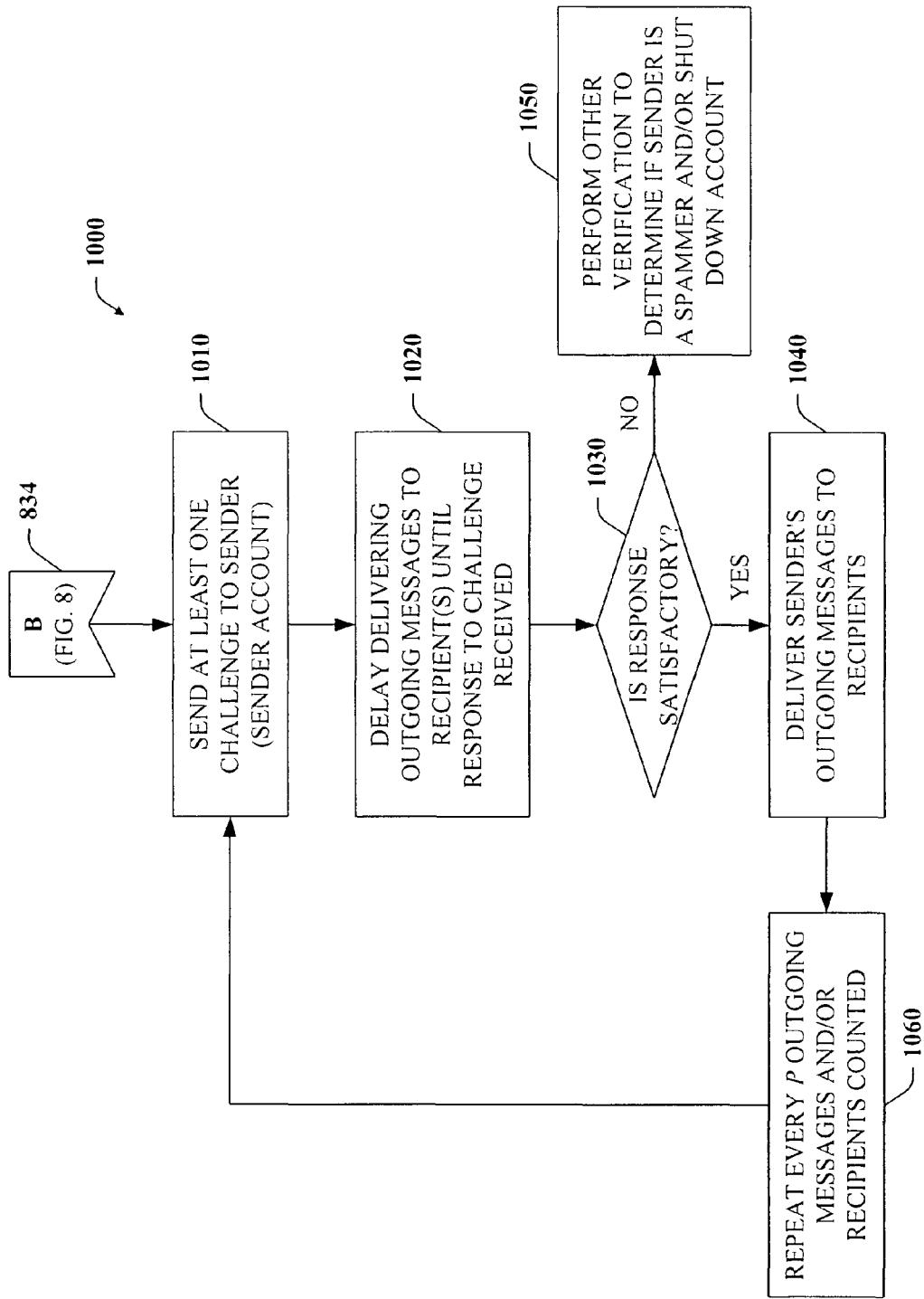
FIG. 10 is a flow diagram of an exemplary method that facilitates verifying potential spammers in accordance with an aspect of the present invention.

At 810, it is concluded that a sender is a potential spammer. Following at 820, at least one or any combination of the following can be selected depending on user preferences:

(a) at 832, a sample (e.g., at least one) of the sender's outgoing messages can be subjected to human inspection to facilitate verification and/or confirmations, as described in further detail in FIG. 9, infra, that the sender is or is not a spammer;

(b) at 834, a challenge can be generated and sent to the sender's account, whereby a correct and/or timely response to the challenge would be required in order to continue use of message services (e.g., sending/delivery of outgoing messages) as described in further detail in FIG. 10, infra;

(c) at 836, a legal notice and/or warning can be sent to the sender informing him/her that he/she is or may be in violation of the terms of service, whereby legal action may follow; and/or (d) at 838, the sender's account can be shut down at least temporarily and permanently if necessary, when a sufficiently high degree of certainty exists that the sender is a spammer.

If the sender uses a client that the messaging service and/or the reaction process 800 has control over, any one of the above action messages (834, 836, and/or 838) can be delivered as a pop-up at message sending time, for example (e.g., when the sender attempts to send an outgoing message). Alternatively, the pop-up may be delivered at any other suitable time to make the sender aware of the action message as well as his/her required response.

However, if the messaging service and/or the reaction process 800 do not have control, the action message can be delivered to the sender in the same or in a similar format as the sender's outgoing message (e.g., whisper, instant message, chat, email, etc.). That is, if the outgoing message is a whisper-type message, then the action message can be delivered as a whisper-type message. Likewise, if the outgoing message is an instant message, then the action message to the sender can be an instant message as well.

The sender can also receive notification that further outgoing messages will be immediately held back from delivery (e.g., shut down sending capabilities) until the sender or spammer performs a required action to acknowledge reading the action message. Acknowledgement can be in the form of electronically signing the message or clicking on a link, for example. In practice, the sender may be asked to acknowledge reading a legal notice informing him/her that she/he is violating one or more terms of service. The notice can also indicate whether service (e.g., at least sending capabilities) will be shut down immediately.

Message delivery may be at least temporarily suspended until the sender acknowledges and/or responds to the action message(s). Alternatively, the sender may be allowed to send a minimum number of outgoing messages before acknowledging or responding to the action message(s).

In some cases, the sender may not be aware that he/she's been flagged as a potential spammer. Likewise, the sender may be unaware that any action is being taken to investigate his/her usage, and in particular, that the content of his/her outgoing messages is being investigated. When a sender has been flagged as a potential spammer, one option available to a messaging service is to sample at least a portion of a suspicious sender's outgoing messages to ascertain whether the sender is in fact a spammer. A flow diagram of an exemplary method 900 that facilitates this type of action against a potential spammer is illustrated in FIG. 9.

The method 900 involves manually inspecting at least a subset of the potential spammer's outgoing messages at 910 by a human. Human inspection can verify, the content of the messages as well as determine reasons for the account to be sending suspicious messages. For example, imagine that the outgoing messages are addressed to a distribution list comprising dozens or hundreds of customers or patrons who have requested information on a touring art exhibit. The messages usually contain a URL directing recipients to order tickets, prints, etc. at a website. These types of outgoing messages could be scored high enough for a number of reasons to exceed some threshold level that would indicate that it may be spam. For instance, imagine that the messages include a large number of recipients, a URL which is characteristic of spam, and/or perhaps even some advertising, jargon that mimic the type of language more commonly found in spam.

Thus, at 920, human inspection can determine whether the messages are spam. If the messages are not spam, then the score associated with the sender's account can be reset at 930. In addition, the threshold level for flagging the account as a potential spammer can be increased at 940 if there is a legitimate reason for the account to send suspicious messages.

On the contrary if the messages are confirmed to be spam at 920, then at least one of the following actions can be undertaken at 950: the account can be immediately shut down at 952 and/or a legal notice can be delivered to the account at 954 in a similar manner as discussed, supra, in FIG. 8.

Because some spammers may send a few legitimate messages to throw off or elude scoring systems, it can be helpful to periodically validate account usage. In particular, it is useful to make sure that there is some minimal cost per message, ideally one that is too expensive for spammers, but affordable for normal users. One approach to accomplishing this without substantially disrupting or interrupting outgoing message delivery involves sending challenges to the sender or to the account after a given number of outgoing messages and/or recipients are counted. For instances, the account can be required to answer a challenge such as a HIP (human interactive proof) or a computational challenge either after every 30 outgoing messages or every 30 recipients are counted. Alternatively, challenges can be sent in response to feedback from a server that a shut down (e.g., temporary or permanent) of the user's account is coming close due to observations of spam-like activity.

Accurate responses to HIP challenges typically require a human-generated response whereas computational challenges can be performed by a user's computer without the user's knowledge. FIG. 10 demonstrates an exemplary method 1000 that facilitates confirmation of non-spammer account use according to an aspect of the present invention. The method 1000 involves sending at least one challenge to the sender or sender account at 1010. The delivery of outgoing messages from that sender account is delayed or refused at 1020 until an accurate response to the challenge is received. If the response(s) to the challenge(s) is incorrect at 1030, other disciplinary action can be taken such as shutting down the account, manually inspecting some of the outgoing messages, sending a legal notice as well as sending additional challenges to be solved before use of the account can resume.

However, if the response is satisfactory (e.g., challenge is accurately solved) at 1030, then the sender's outgoing messages can be delivered at 1040. Moreover, the method 1000 can be repeated after every P messages or recipients (e.g., each recipient counts as one message) are counted (wherein P is an integer greater than or equal to 1) as a means to periodically check on the user.

In accordance with the present invention as described hereinabove, the following pseudo-code can be employed to carry out at least one aspect of the invention. Variable names are indicated in all uppercase. Dots are used to indicate subfields of a record. For instance, if SENDER is the name of a sender and DURATION is a period such as day or in month, then notation such as SENDER.DURATION.firstupdate is used to indicate the first update time for the list of receivers (recipients) kept over that duration for a particular sender.

The exemplary pseudo-code is as follows:

```
for each RECIPIENT of each outgoing message MESSAGE
(whisper mode, IM, chat room, or email)
{
   SENDER := sender of MESSAGE;
   RECIPIENT := recipient of MESSAGE;
   use one of the following strategies to set SCORE;
   {
      SCORE := 1; # use a constant
   or
      SCORE := score from machine learning spam filter to
MESSAGE;
      optionally SCORE := SCORE + .1 # add a constant
   or
      SCORE := 1 if message contains a URL, .1 otherwise;
   }
   if RECIPIENT is not deliverable then
   {
      SCORE := SCORE + 1;
   }
   if RECIPIENT (in the future) results in an NDR then
   {
      use one of these strategies
      {
         SCORE := SCORE + 1;
      or
         # check that the NDR is real
         if RECIPIENT is on list of RECIPIENTS
         {
            SCORE := SCORE + 1;
         }
      or
         if RECIPIENT is on list of RECIPIENTS and using
            sampling then
         {
            SCORE := SCORE + k;
         }
      }
   }
   BADSENDER := FALSE;
   # optionally, skip some, or all but one duration:
   for each DURATION in (minute, hour, day, week, month,
year, forever)
   {
      # reset counters if necessary
      if (now - SENDER.DURATION.firstupdate > DURATION)
      {
         reset SENDER.DURATION (total := 0, list :=
empty, SENDER.DURATION.goodtotal := 0, firstupdate := now);
      }
      SENDER.DURATION.total := SENDER.DURATION.total +
SCORE;
      # optionally, compute bonuses for legitimate mail
      # for instance, if the score from spam filter
      # is < .1, then assume it is legitimate
      if message spam filter probability < .1
      {
         SENDER.DURATION.goodtotal :=
            SENDER.DURATION.goodtotal + .1;
         if SENDER.DURATION.goodtotal >
            maxgoodtotal.DURATION
         {
            SENDER.DURATION.goodtotal :=
               maxgoodtotal.DURATION;
         }
      }
      if SENDER.DURATION.total -
SENDER.DURATION.goodtotal>
            threshold.DURATION then
      {
         BADSENDER := TRUE;
      }
      optionally check if hash of RECIPIENT modulo k = 0;
      if hash != 0, go to next duration;
      SENDER.DURATION.list[RECIPIENT] :=
max(SENDER.DURATION.list[RECIPIENT], SCORE);
      compute TOTAL of SENDER.DURATION.list for all
recipients;
      if TOTAL - SENDER.DURATION.goodtotal >
            listthreshold.DURATION then
      {
         BADSENDER := TRUE;
      }
   }
   # Now, we know if this sender should be added to the
bad senders list
   if BADSENDER == FALSE
   {
      go on to next message; skip remainder;
   }
   perform one or more of the following actions
   {
      suspend or revoke the account of SENDER;
   or
      forward MESSAGE for human inspection (optionally,
do this if we have not recently sent a message for
inspection);
   or
      send a legal notice to the spammer reminding them
of the terms of service, if such a notice has not been
recently sent;
   or
      require the account to answer another challenge,
such as a HIP or computational challenge; when the
challenge has been answered, reset the scores as
appropriate.
   }
}
```

Figure 11:
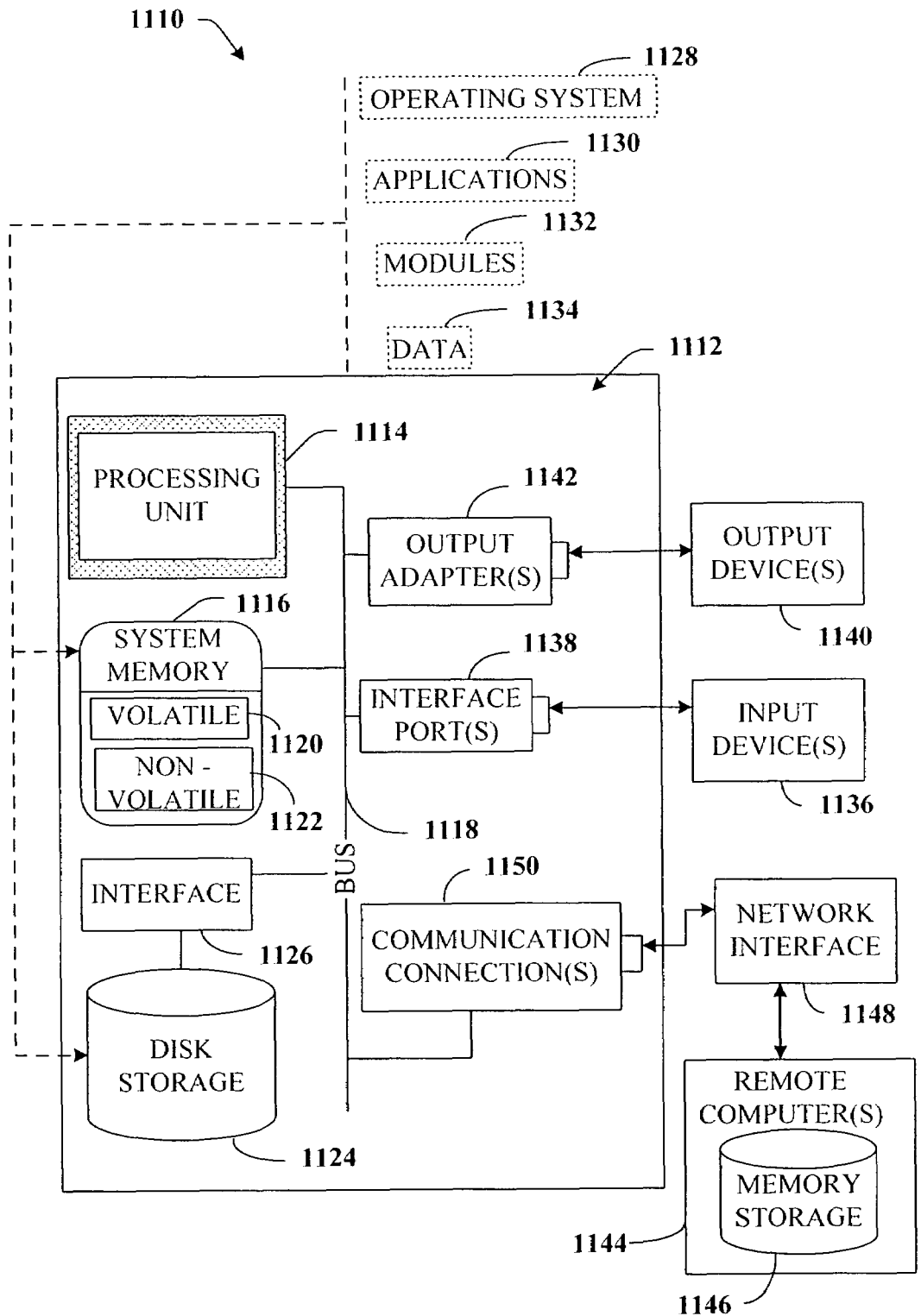
FIG. 11 is a schematic block diagram of an exemplary communication environment in accordance with the present invention.

In order to provide additional context for various aspects of the present invention, FIG. 11 and the following discussion are intended to provide a brief, general description of a suitable operating environment 1110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1018. The system bus 1118 couples the system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present intention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of points as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI). Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates mitigation of outgoing spam, comprising:
a processor;
a memory communicatively coupled to the processor, the memory having stored therein computer-executable instructions to implement the system, including:
a detection component employed by an outgoing message server that detects a potential spammer in connection with at least one outgoing message sent by an entity, the detection of a potential spammer being based in part on a total score per sender assigned to the entity of the at least one outgoing message exceeding a threshold score indicative of a spammer; and
an action component that upon receiving information from the detection component that the entity is a potential spammer initiates at least one action to mitigate spam from the entity, wherein the at least one action includes limiting sending of outgoing messages by the entity to a specified volume of outgoing messages until a subset of the at least one outgoing message are manually inspected by a human inspector and confirmed by the human inspector as not being spam.

2. The system of claim 1, the outgoing message further comprising at least one of email message spam, instant message spam, whisper spam, or chat room spam.

3. The system of claim 1 wherein the action initiated further comprises at least one of:
shutting down a user account of the entity used to send the at least one outgoing message;
requiring at least one of a HIP challenge or a computational challenge to be solved by the potential spammer respectively; and
sending the potential spammer a legal notice regarding at least one violation of messaging service terms.

4. The system of claim 1, wherein the detection component increases the, threshold score for the entity upon confirmation that the subset of the at least one outgoing message is not spam.

5. The system of claim 1, wherein the detection is further based upon an outgoing message recipient count that is computed with each recipient of a set of recipients associated with the at least one outgoing message, wherein each recipient is counted only once.

6. The system of claim 5, comprising keeping track per recipient an outgoing message that is most likely to be spam, wherein each outgoing message of the at least one outgoing message is assigned a score indicating the likeliness of the outgoing message being spam.

7. The system of claim 5, comprising using a random function on a unique identifier for each recipient to track a subset of the set of recipients to estimate the outgoing message recipient count.

8. The system of claim 5, wherein the recipient count comprises one or more recipients listed in at least one of a to: field, a cc: field, or a bcc: field.

9. The system of claim 1, wherein the detection is further based upon message rate monitoring comprising computing the volume of outgoing messages over a duration of time.

10. The system of claim 9, wherein the duration of time comprises at least one of minutes, hours, days, weeks, months, or years.

11. The system of claim 1, wherein the detection is further based upon message volume monitoring comprising a total volume of messages since activation of the entity's user account.

12. The system of claim 1, wherein each recipient of an outgoing message constitutes one message.

13. The system of claim 1, wherein the detection component processes and analyzes the outgoing messages to determine at least one of whether the message is likely to be spam or whether the sender is a potential spammer.

14. The system of claim 1, wherein a number of apparently legitimate outgoing messages is used as a bonus in the total score per sender to offset one or more other scores applied in the total score per sender, wherein the one or more other scores are based upon one or more other indications of spam.

15. The system of claim 14, wherein the number of apparently legitimate messages is estimated with a spam filter.

16. The system of claim 14, wherein the bonus from the number of apparently legitimate messages is limited.

17. The system of claim 1, wherein the total score per sender is based upon a number of non-deliverable messages of the at least one outgoing message.

18. The system of claim 17, wherein the number of non-deliverable messages is estimated at least in part from Non Delivery Receipts.

19. The system of claim 18, wherein validity of the Non Delivery Receipts is checked.

20. The system of claim 19, wherein validity of the Non Delivery Receipts is checked against a list of recipients of messages from the sender.

21. The system of claim 20, wherein the list of recipients is a sample and the penalty of a Non Delivery Receipt is correspondingly increased.

22. The system of claim 1, wherein the detection component computes one or more scores assigned to each of the at least one outgoing message to determine the total score per sender.

23. The system of claim 22, wherein the threshold score is adjustable per sender.

24. The system of claim 1, wherein spam filtering comprises employing a filter trained to recognize at least one of non-spam like features or spam-like features in outgoing messages.

25. The system of claim 1, wherein spam filtering is performed with a machine learning approach.

26. The system of claim 1, wherein spam filtering comprises assigning a probability per outgoing message to indicate a likelihood that the message is any one of more spam-like or less spam-like.

27. The system of claim 1, further comprising a scoring component that operates in connection with at least one of spam filtering, total recipient count, unique recipient count, message volume monitoring or message rate monitoring.

28. The system of claim 27, wherein the scoring component assigns the total score per sender based at least in part upon at least one of volume of outgoing messages, rate of outgoing messages, recipient count, or message content.

29. The system of claim 27, wherein the scoring component at least one of assigns or adds a constant value to one or more outgoing messages to mitigate spammers from manipulating spam filtering systems.

30. The system of claim 27, wherein the scoring component assigns a selected value to outgoing messages identified as having at least one spam-like feature.

31. The system of claim 30, wherein the at least one spam-like feature is a URL.

32. The system of claim 30, wherein the at least one spam-like feature comprises contact information.

33. The system of claim 32, wherein the contact information comprises a telephone number, the telephone number comprising at least one of an area code or a prefix to identify a geographic location associated with the message to thereby facilitate identifying the potential spammer.

34. The system of claim 1, further comprising a user-based message generator component that generates outgoing messages addressed to one or more recipients based in part upon sender preferences.

35. A method that facilitates mitigation of outgoing spam comprising:
   employing a processor executing computer executable instructions to perform the following acts:
      detecting, via an outgoing message server comprising at least one hardware component, a potential spammer in connection with at least one outgoing message sent by an entity, the detection of a potential spammer being based in part on a total score per sender assigned to the entity of the at least one outgoing message exceeding a threshold score indicative of a spammer;
      receiving information from a detection component that the entity is a potential spammer; and
      initiating at least one action that facilitates mitigating spamming from the entity, wherein the at least one action includes limiting sending of outgoing messages by the entity to a specified volume of outgoing messages until a subset of the at least one outgoing message are manually inspected by a human inspector as not being spam.

36. The method of claim 35, wherein the at least one outgoing message further comprises at least one of mail message spam, instant message spam, whisper spam, and chat room spam.

37. The method of claim 35, further comprising monitoring outgoing messages per sender with respect to at least one of a volume of outgoing messages, a volume of recipients, or a rate of outgoing messages.

38. The method of claim 35, wherein detecting a potential spammer further comprises:
   performing at least two of the following:
      assigning a score per outgoing message based at least in part upon content of the message,
      assigning a score per sender based at least in part upon outgoing message volume per sender,
      assigning a score per sender based at least in part upon outgoing message rate per sender,
      assigning a score per sender based at least in part upon a total recipient count per sender,
      or assigning a score per sender based at least in part upon a unique recipient count per sender;
   computing the total score per sender further based upon two or more of the score per outgoing message, the score, per sender based at least in part upon outgoing message volume per sender, the score per sender based at least in part upon outgoing message rate per sender, the score per sender based at least in part upon a total recipient count per sender, or the score per sender based at least in part upon a unique recipient count per sender; and
   determining whether the sender is a potential spammer based at least in part upon the total score associated with the sender.

39. The method of claim 35, further comprising tracking one or more recipients and associated outgoing messages addressed to the recipients to facilitate identifying one or more most spam-like messages received per sender.

40. The method of claim 39, further comprising assigning one or more scores to the one or more most spam-like messages and aggregating the scores per sender to compute the total score per sender.

41. The method of claim 35, wherein the at least one action comprises terminating a sender account.

42. The method of claim 41, wherein the sender account is terminated when there is substantial certainty that the outgoing messages sent by a sender are spam.

43. The method of claim 42, wherein substantial certainty that the outgoing messages are spam is determined in part by at least one of the following:
   at least a portion of the outgoing message comprises at least one of an exact match and a near match to known spam; or
   at least a portion of the outgoing message comprises a phrase that a human has determined to be spam-like.

44. The method of claim 35, wherein the at least one action comprises temporarily suspending outgoing message delivery from a sender account.

45. The method of claim 35, wherein the at least one action comprises requiring a sender account to resolve one or more challenges.

46. The method of claim 45, wherein the sender account is limited to a specified number of recipients or outgoing messages per challenge until a specified maximum number of challenges are solved, and after the specified maximum number of challenges are solved then the sender account is limited to a specified sending rate of a number of outgoing messages per time period.

47. The method of claim 46, wherein the specified spending rate limit may be increased by solving additional challenges.

48. The method of claim 45, wherein the one or more challenges comprise a computational challenge or a human interactive proof.

49. The method of claim 45, wherein the one or more challenges are delivered as a pop up message.

50. The method of claim 45, wherein the one or more challenges are delivered to the sender account via a message format similar to the sender's outgoing messages.

51. The method of claim 45, wherein the one or more challenges are delivered to the sender account in response to feedback from a server that a shutdown of the account is approaching.

52. The method of claim 35, wherein the at least one action comprises sending a legal notice to the sender that the sender is in violation of terms of service and suspending an account of the sender.

53. The method of claim 52, further comprising requiring the sender to respond to the legal notice acknowledging that the sender has read the legal notice prior to removing the suspension of the account via at least one of providing an electronic signature or clicking on a link.

54. The method of claim 52, wherein the legal notice is delivered via a pop-up message.

55. The method of claim 35, wherein delivery of outgoing messages is temporarily suspended until a response to the action is received.

56. The method of claim 35, wherein a minimum number of outgoing messages are permitted for delivery before a response to the action is received.

57. The method of claim 35, further comprising estimating a total volume of recipients per sender to facilitate identifying a potential spammer.

58. The method of claim 57, wherein estimating a total volume of distinct recipients per sender comprises:
- computing a hash function per recipient to obtain a hash value per recipient;
- setting a hash modulo value; and
- adding the recipient to a list for message tracking when the recipient's hash value equals the hash modulo value to facilitate estimating a total volume of distinct recipients per sender.

59. The method of claim 58, further comprising:
- tracking worst-scoring messages each listed recipient receives per sender;
- computing the total score per sender of substantially all listed recipients' scores per sender;
- and comparing the total score per sender with a threshold level associated with the sender to determine whether the sender is a potential spammer.

60. A computer-readable storage medium having stored thereon the following computer executable components:
- a detection component employed by an outgoing message server that detects a potential spammer in connection with at least one outgoing message sent from an entity, the detection of a potential spammer being based on a total score per sender assigned to the entity of the at least one outgoing message exceeding a threshold score indicative of a spammer; and
- an action component that upon receiving information from the detection component that the entity is a potential spammer initiates at least one action mitigating spamming by the entity, wherein the at least one action includes limiting sending of outgoing messages by the entity to a specified volume of outgoing messages until a subset of the at least one outgoing message are manually inspected by a human inspector and confirmed by the human inspector as not being spam.

61. A system that facilitates spam detection comprising:
a processor;
a memory communicatively coupled to the processor, the memory having-stored therein computer-executable instructions to implement the system, including:
a means employed by an outgoing message server for detecting a potential spammer in connection with at least one outgoing message sent from an account of an entity, the detection of a potential spammer being based on a total score per sender assigned to the entity of the at least one outgoing message exceeding a threshold score indicative of a spammer,
a means for receiving information from a detection component that the entity is a potential spammer; and
a means for initiating at least one action that facilitates mitigating spamming by the entity, wherein the at least one action includes limiting sending of outgoing messages by the entity to a specified volume of outgoing messages until a subset of the at least one outgoing message are manually inspected by a human inspector and confirmed by the human inspector as not being spam.

* * * * *